US012645836B2

(12) United States Patent
Schroeder et al.

(10) Patent No.: US 12,645,836 B2
(45) Date of Patent: Jun. 2, 2026

(54) SYSTEMS AND METHODS FOR CONTROLLING DATA EXPOSURE USING ARTIFICIAL-INTELLIGENCE-BASED MODELING

(71) Applicant: Grey Market Labs, PBC, Falls Church, VA (US)

(72) Inventors: Kristopher Paul Schroeder, Falls Church, VA (US); Timothy Ryan Underwood, Burke, VA (US)

(73) Assignee: Grey Market Labs, PBC, Falls Church, VA (US)

( * ) Notice: Subject to any disclaimer, the term of this patent is extended or adjusted under 35 U.S.C. 154(b) by 0 days.

(21) Appl. No.: 18/903,145

(22) Filed: Oct. 1, 2024

(65) Prior Publication Data

US 2025/0232065 A1 Jul. 17, 2025

Related U.S. Application Data

(63) Continuation of application No. 17/931,563, filed on Sep. 13, 2022, now Pat. No. 12,135,822, which is a
(Continued)

(51) Int. Cl.
*G06F 21/62* (2013.01)
*G06N 20/20* (2019.01)

(52) U.S. Cl.
CPC ......... *G06F 21/6263* (2013.01); *G06N 20/20* (2019.01)

(58) Field of Classification Search
None
See application file for complete search history.

(56) References Cited

U.S. PATENT DOCUMENTS 8,522,052 B1 8/2013 Lesea
8,739,281 B2 5/2014 Wang et al.
(Continued)

FOREIGN PATENT DOCUMENTS

WO 2016149237 A1 9/2016

OTHER PUBLICATIONS

Office Action mailed Feb. 18, 2025 in Canadian Application 3,098,702.
(Continued)

*Primary Examiner* — Trang T Doan
(74) *Attorney, Agent, or Firm* — Polsinelli LLP

(57) ABSTRACT

Systems and methods for controlling the exposure of data privacy elements are provided. The systems and methods may generate an artificial profile model. The artificial profile model may include a constraint for generating new artificial profiles. A signal may be received indicating that a computing device is requesting access to a network location. One or more data privacy elements associated with the computing device can be detected. An artificial profile can be determined for the computing device. The artificial profile may be usable to identify the computing device. The one or more data privacy elements may be automatically modified according to the constraint included in the artificial profile model. The method may include generating a new artificial profile for the computing device. The new artificial profile may include the modified one or more data privacy elements. The new artificial profile may mask the computing device from being identified.

21 Claims, 13 Drawing Sheets

Related U.S. Application Data continuation of application No. 16/733,729, filed on Jan. 3, 2020, now Pat. No. 11,487,903, which is a continuation of application No. 16/273,877, filed on Feb. 12, 2019, now Pat. No. 10,558,823, which is a continuation-in-part of application No. 16/005,268, filed on Jun. 11, 2018, now Pat. No. 10,282,553.

(56) References Cited

U.S. PATENT DOCUMENTS

| | | | |
|---|---|---|---|
| 8,761,403 | B2 | 6/2014 | Su et al. |
| 8,893,285 | B2 | 11/2014 | Zucker et al. |
| 9,786,281 | B1 | 10/2017 | Adams et al. |
| 9,846,716 | B1 | 12/2017 | Scott et al. |
| 10,158,653 | B1 | 12/2018 | Magcale et al. |
| 10,178,067 | B1 | 1/2019 | Kumar et al. |
| 10,296,548 | B2 | 5/2019 | Hemmaplardh et al. |
| 10,356,050 | B1 * | 7/2019 | Kumar .................... H04L 67/02 |
| 10,803,197 | B1 | 10/2020 | Liao et al. |
| 10,936,744 | B1 | 3/2021 | Trepetin et al. |
| 2008/0034223 | A1 | 2/2008 | Funahashi |
| 2009/0254994 | A1 | 10/2009 | Waterson |
| 2012/0124161 | A1 * | 5/2012 | Tidwell .................. H04H 60/31 709/217 |
| 2012/0124372 | A1 | 5/2012 | Dilley et al. |
| 2012/0166582 | A1 | 6/2012 | Binder |
| 2015/0326608 | A1 | 11/2015 | Shabtai |
| 2016/0092699 | A1 | 3/2016 | Riva et al. |
| 2016/0098360 | A1 | 4/2016 | Gillespie et al. |
| 2016/0112451 | A1 * | 4/2016 | Jevans .................... G06F 21/56 726/25 |
| 2016/0170778 | A1 | 6/2016 | Kalyanpur |
| 2017/0206365 | A1 | 7/2017 | Garcia et al. |
| 2017/0243028 | A1 | 8/2017 | LaFever et al. |
| 2018/0121552 | A1 | 5/2018 | Bostick et al. |
| 2018/0176192 | A1 | 6/2018 | Davis et al. |
| 2018/0225230 | A1 | 8/2018 | Litichever et al. |
| 2018/0300504 | A1 | 10/2018 | Hailpern et al. |
| 2019/0332814 | A1 * | 10/2019 | Bos .......................... G06F 21/64 |
| 2019/0377652 | A1 * | 12/2019 | Sahoo ................. G06F 11/3447 |
| 2021/0084057 | A1 | 3/2021 | Chhabra |

OTHER PUBLICATIONS

Notice of Allowance mailed Mar. 5, 2025 in U.S. Appl. No. 18/515,321.
Office Action issued Oct. 8, 2025 in EP Application 24207006.8.
Office Action issued Sep. 2, 2025 in Australian Application 2024204413.
First Action Interview Pilot Program Pre-Interview Communication mailed Sep. 4, 2018 in U.S. Appl. No. 16/005,268.
Notice of Allowance mailed Dec. 26, 2018 in U.S. Appl. No. 16/005,268.
Laperdrix, Pierre et al., "Mitigating Browser Fingerprinting Tracking: Multi-level Reconfiguration and Diversification;" Proceedings of the IEEE/ACM 10th International Symposium on Software Engineering for Adaptive and Self-Managing Systems (SEAMS); May 2015; Firenze, Italy; pp. 98-108; hal-01121108.
International Search Report and Written Opinion mailed Mar. 25, 2019 in International Application PCT/US2019/014143.
Office Action mailed Dec. 19, 2019 in U.S. Appl. No. 16/280,755.
Notice of Allowance mailed Feb. 28, 2020 in U.S. Appl. No. 16/280,755.
First Action Interview Pilot Program Pre-Interview Communication mailed May 31, 2019 in U.S. Appl. No. 16/273,877.
Notice of Allowance mailed Oct. 4, 2019 in U.S. Appl. No. 16/273,877.
Office Action mailed Dec. 27, 2021 in U.S. Appl. No. 16/876,421.
Notice of Allowance mailed Jun. 2, 2022 in U.S. Appl. No. 16/876,421.
Notice of Allowance mailed Jun. 27, 2022 in U.S. Appl. No. 16/733,729.
Office Action mailed Nov. 7, 2022 in U.S. Appl. No. 17/349,791.
Office Action mailed Dec. 15, 2022 in U.S. Appl. No. 17/334,624.
Notice of Allowance mailed Mar. 7, 2023 in U.S. Appl. No. 17/349,791.
Office Action mailed May 4, 2023 in U.S. Appl. No. 17/822,479.
Office Action mailed May 30, 2023 in Israeli Application 278307.
Office Action mailed Jun. 15, 2023 in U.S. Appl. No. 17/334,624.
Notice of Allowance mailed Aug. 21, 2023 in U.S. Appl. No. 17/822,479.
Office Action mailed Oct. 4, 2023 in Australian Application 2019287571.
Office Action mailed Dec. 1, 2023 in U.S. Appl. No. 17/931,563.
Notice of Allowance mailed Jan. 23, 2024 in U.S. Appl. No. 17/334,624.
Office Action mailed May 23, 2024 in U.S. Appl. No. 18/329,266.
Notice of Allowance mailed Jul. 3, 2024 in U.S. Appl. No. 17/931,563.
Notice of Allowance mailed Sep. 5, 2024 in U.S. Appl. No. 18/329,266.
Office Action mailed Nov. 27, 2024 in U.S. Appl. No. 18/515,321.
Office Action mailed Jun. 18, 2025 in U.S. Appl. No. 18/636,354.
Notice of Acceptance issued Dec. 5, 2025 in Australian Application 2024204413.
Notice of Allowance mailed Dec. 16, 2025 in U.S. Appl. No. 18/636,354.
Office Action mailed Apr. 3, 2026 in U.S. Appl. No. 18/966,533.

* cited by examiner

100

110

140

150

130

180

170

120

160

INTERNET

HOME NETWORK

SITE NETWORK

SYSTEMS AND METHODS FOR CONTROLLING DATA EXPOSURE USING ARTIFICIAL-INTELLIGENCE-BASED MODELING

CROSS-REFERENCE TO RELATED APPLICATIONS

The present application is a continuation of U.S. patent application Ser. No. 17/931,563 filed Sep. 13, 2022, which is a continuation of U.S. patent application Ser. No. 16/733, 729 filed Jan. 3, 2020, now U.S. Pat. No. 11,487,903, which is a continuation of U.S. patent application Ser. No. 16/273, 877 filed Feb. 12, 2019, now U.S. Pat. No. 10,558,823, which is a continuation in part and claims the priority benefit of U.S. patent application Ser. No. 16/005,268, filed Jun. 11, 2018, now U.S. Pat. No. 10,282,553, all of which are incorporated herein by reference in their entireties.

TECHNICAL FIELD

The present disclosure relates to systems and methods for controlling data exposed to external networks using artificial-intelligence-based modeling. More particularly, the present disclosure relates to systems and methods for dynamically creating, modifying, and validating artificial profiles using a data protection platform to control data exposure.

BACKGROUND

Every computing device connected to the Internet produces exposable data. The exposable data may be accessed by authorized network hosts (e.g., web servers providing access to a webpage) or unauthorized network hosts (e.g., hackers) through a network. In some scenarios, the exposed data can be used to reveal sensitive information relating to devices or the users operating the devices. For instance, when a laptop connects to a web server to gain access to a webpage, the web server can query the browser for certain information. However, an unauthorized network host could exploit a vulnerability in a network using that information. For example, the unauthorized network host can execute a data breach of a network using the obtained information. The near-constant usage of computing devices and the Internet increases the complexity of and privacy risks associated with exposable data.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method. In some embodiments, the method may include identifying a set of data privacy elements and generating an artificial profile model. For example, a data privacy element may characterize a feature of a computing device. A data privacy element may be detectable by an unauthorized network host (e.g., a hacker or a virus) or an authorized network host (e.g., an authorized website or web server). A network host, for example, can be a computer or other device accessible to a network and providing a service to devices on the network or the network itself; this may include servers (e.g. web servers) as well as networking hardware (e.g. repeaters, hubs, switches, routers), whether or not the presence of the networking hardware is known or detectable by the network itself. A web server, for example, can be any device that is able to exchange data with another interconnected device or hosted service. This is independent of the communication medium (e.g. copper, wireless), modality (e.g. analog, digital) protocol, or protocol layer, including layered protocols. Web servers may also be embedded in devices including, but not limited to, printers, routers, and/or webcams and can be hardware, software, and/or service-based.

Further, the artificial profile model may include the set of data privacy elements. The artificial profile model may include a constraint for generating new artificial profiles. The method may also include receiving a signal indicating that a computing device is requesting access to a network location; and detecting one or more data privacy elements associated with the computing device request to access the network location. A network location, for example, can be any identifiable device or capability that is addressable via any means (e.g. an IP address in an IP network; a MAC address in an ethernet network; etc.). The method may include determining an artificial profile for the computing device. The artificial profile may include the one or more data privacy elements. The artificial profile may be usable to identify the computing device. The method may include automatically modifying the one or more data privacy elements. For example, modifying the one or more data privacy elements may use the constraint included in the artificial profile model. The method may include generating a new artificial profile for the computing device. The new artificial profile may include the modified one or more data privacy elements. The new artificial profile may mask the computing device from being identified.

Embodiments of the present disclosure include a system. The system may comprise: one or more data processors; and a non-transitory computer-readable storage medium containing instructions which, when executed on the one or more data processors, cause the one or more data processors to perform operations including the methods described above and herein.

Embodiments of the present disclosure include a computer-program product tangibly embodied in a non-transitory machine-readable storage medium, including instructions configured to cause a data processing apparatus to perform operations including the methods described above and herein.

BRIEF DESCRIPTION OF THE DRAWINGS

The specification makes reference to the following appended figures, in which use of like reference numerals in different figures is intended to illustrate like or analogous components.

3

Figure 1:
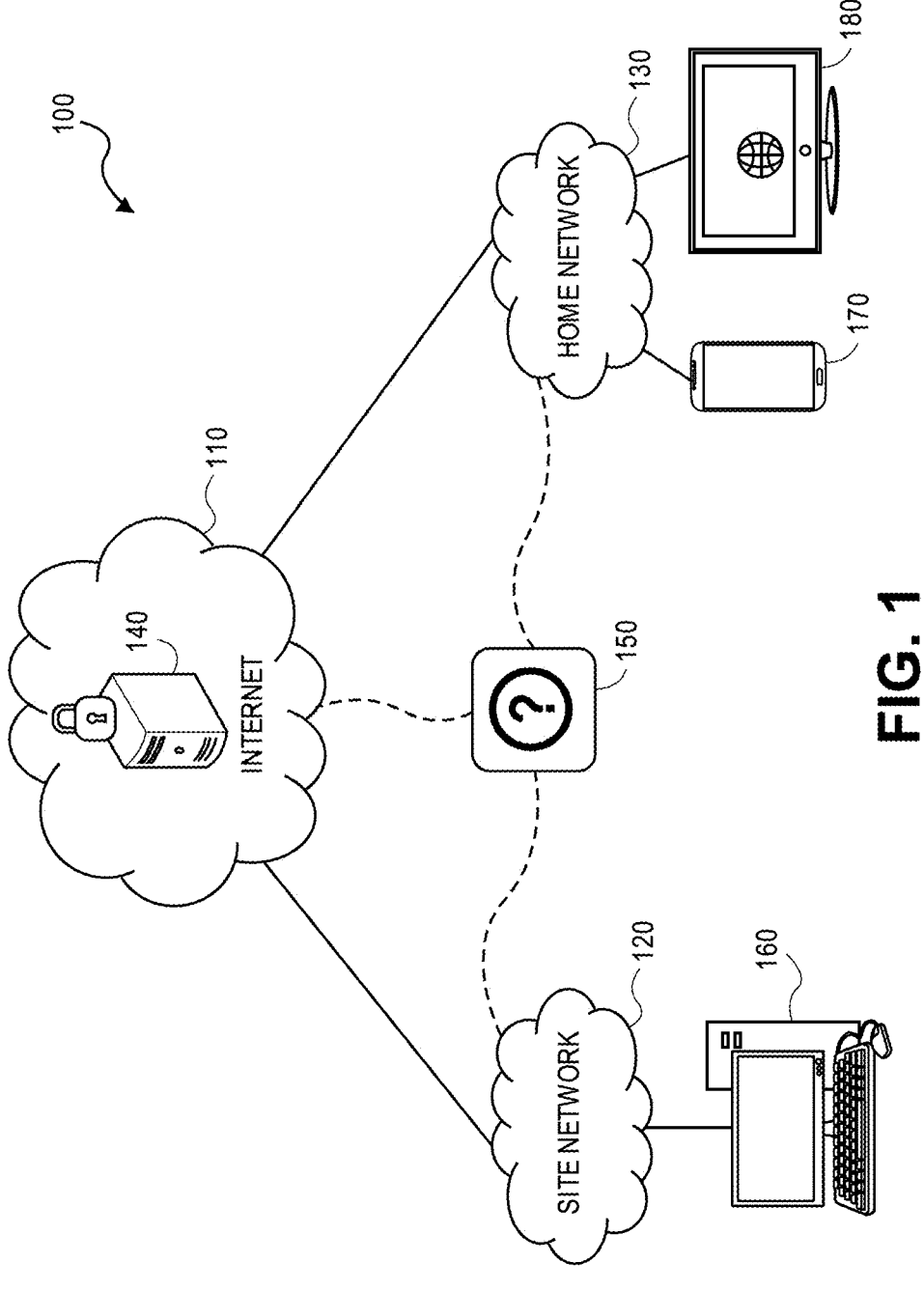

FIG. 1 is a schematic diagram illustrating a network environment in which exposable data can be accessed by authorized or unauthorized network hosts, according to certain aspects of the present disclosure.

Figure 2:
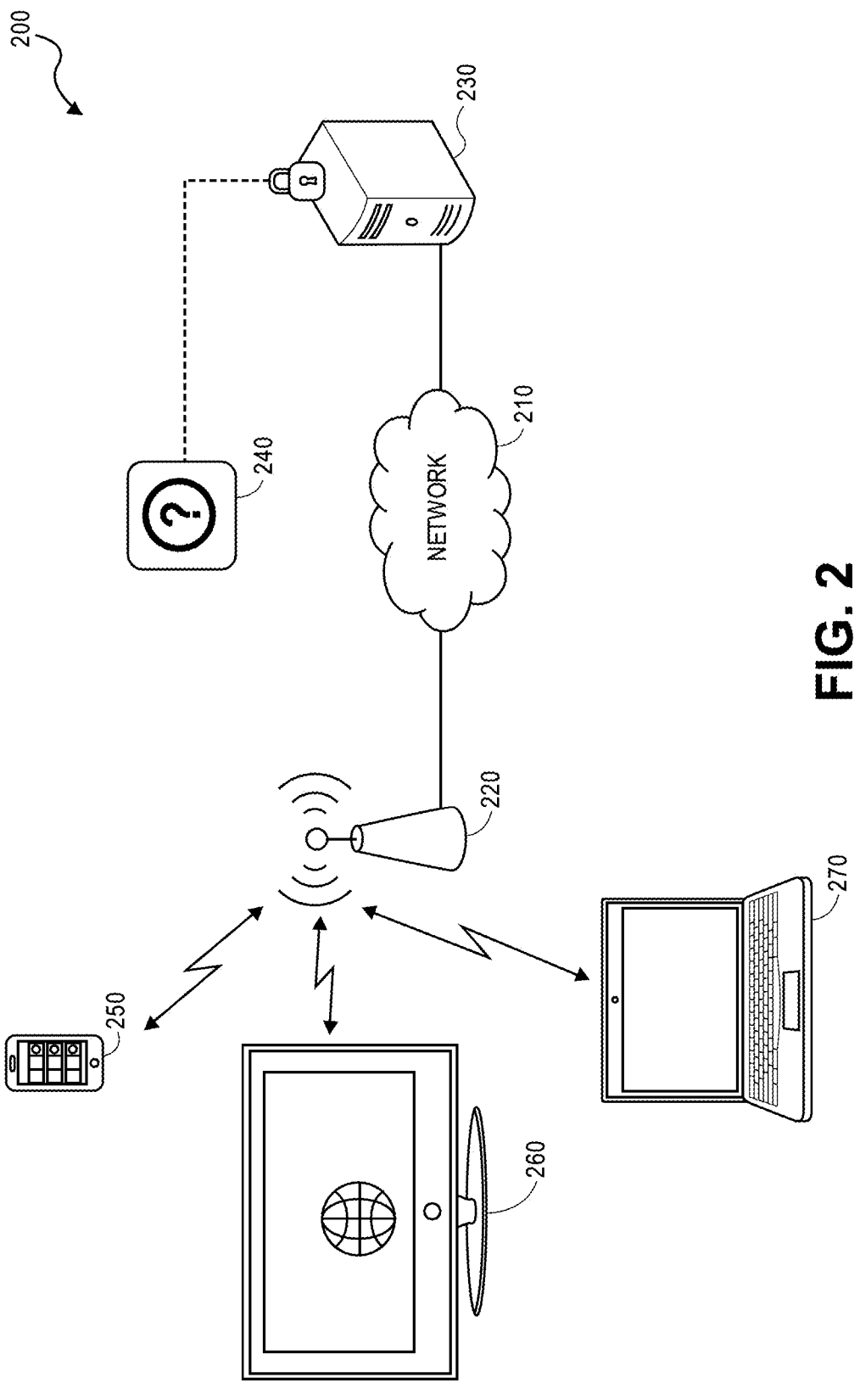

FIG. 2 is a schematic diagram illustrating a network environment in which exposable data associated with computing devices can be accessed by authorized or unauthorized network hosts, according to certain aspects of the present disclosure.

Figure 3A:
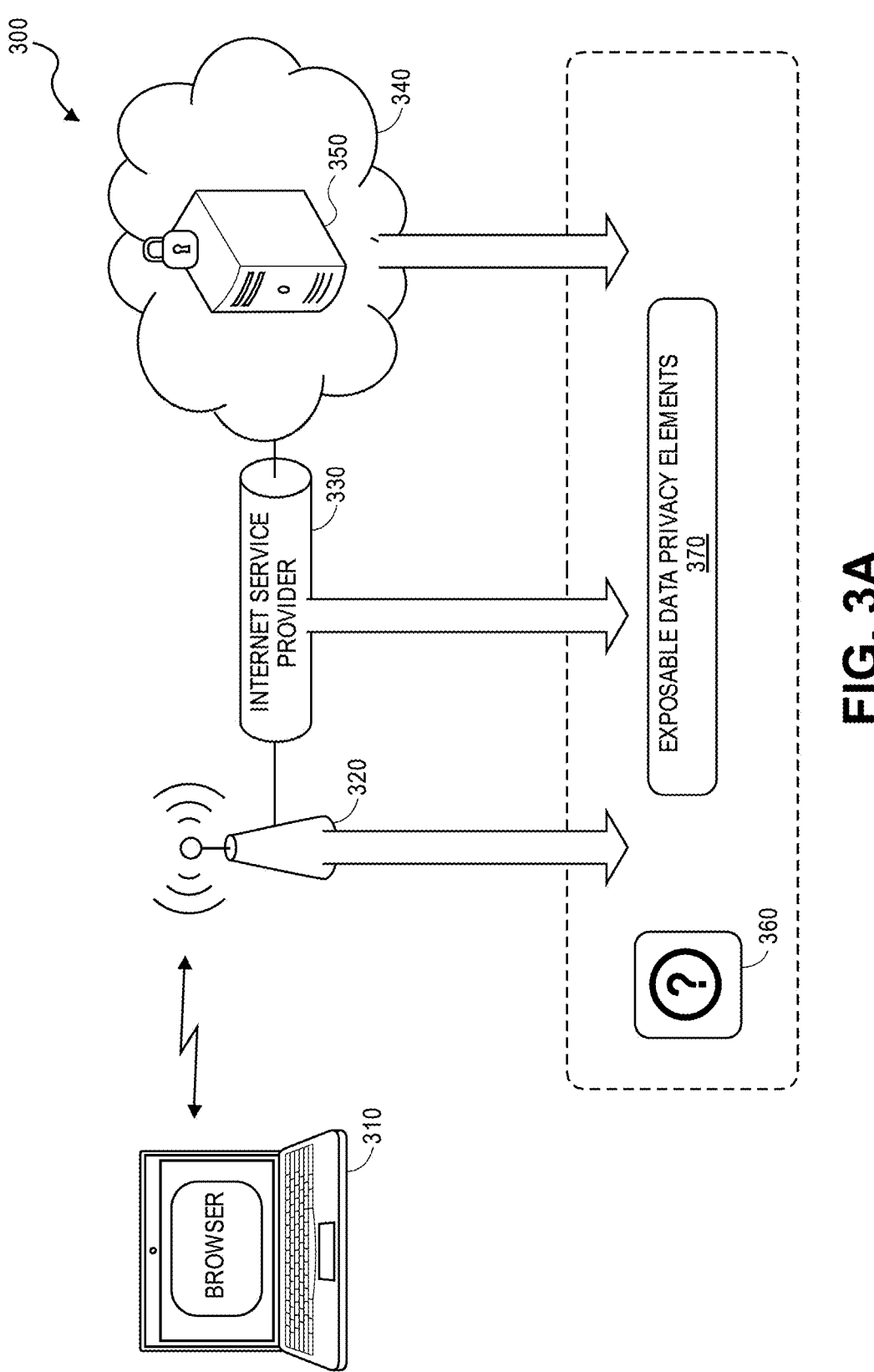

FIG. 3A is a schematic diagram illustrating a network environment in which exposable data can be accessed by authorized or unauthorized network hosts at various stages of an interaction session, according to certain aspects of the present disclosure.

Figure 3B:
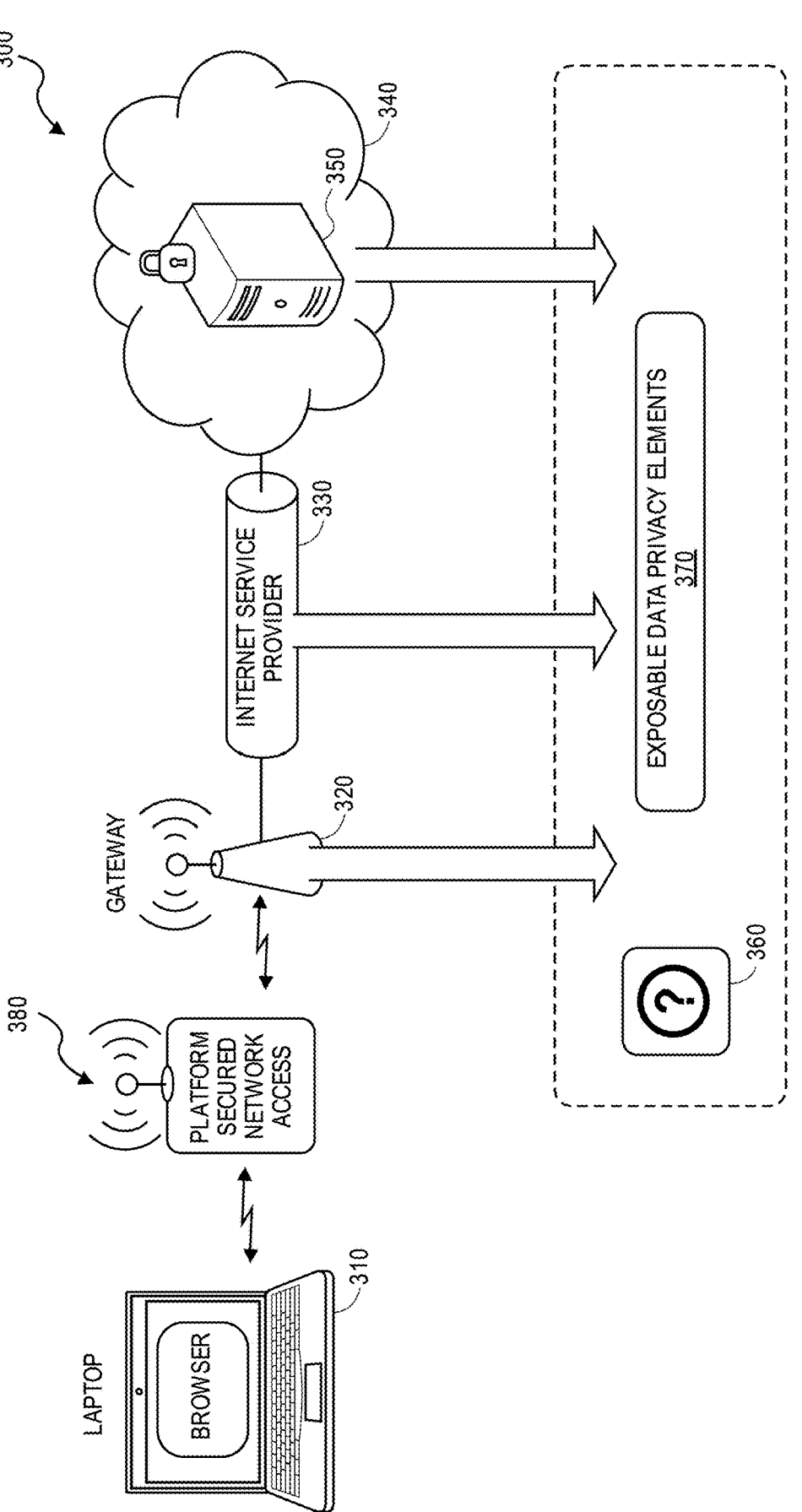

FIG. 3B is a schematic diagram illustrating the network environment of FIG. 3A with the addition of platform-secured network access that isolates the communication, according to certain aspects of the present disclosure.

Figure 4A:
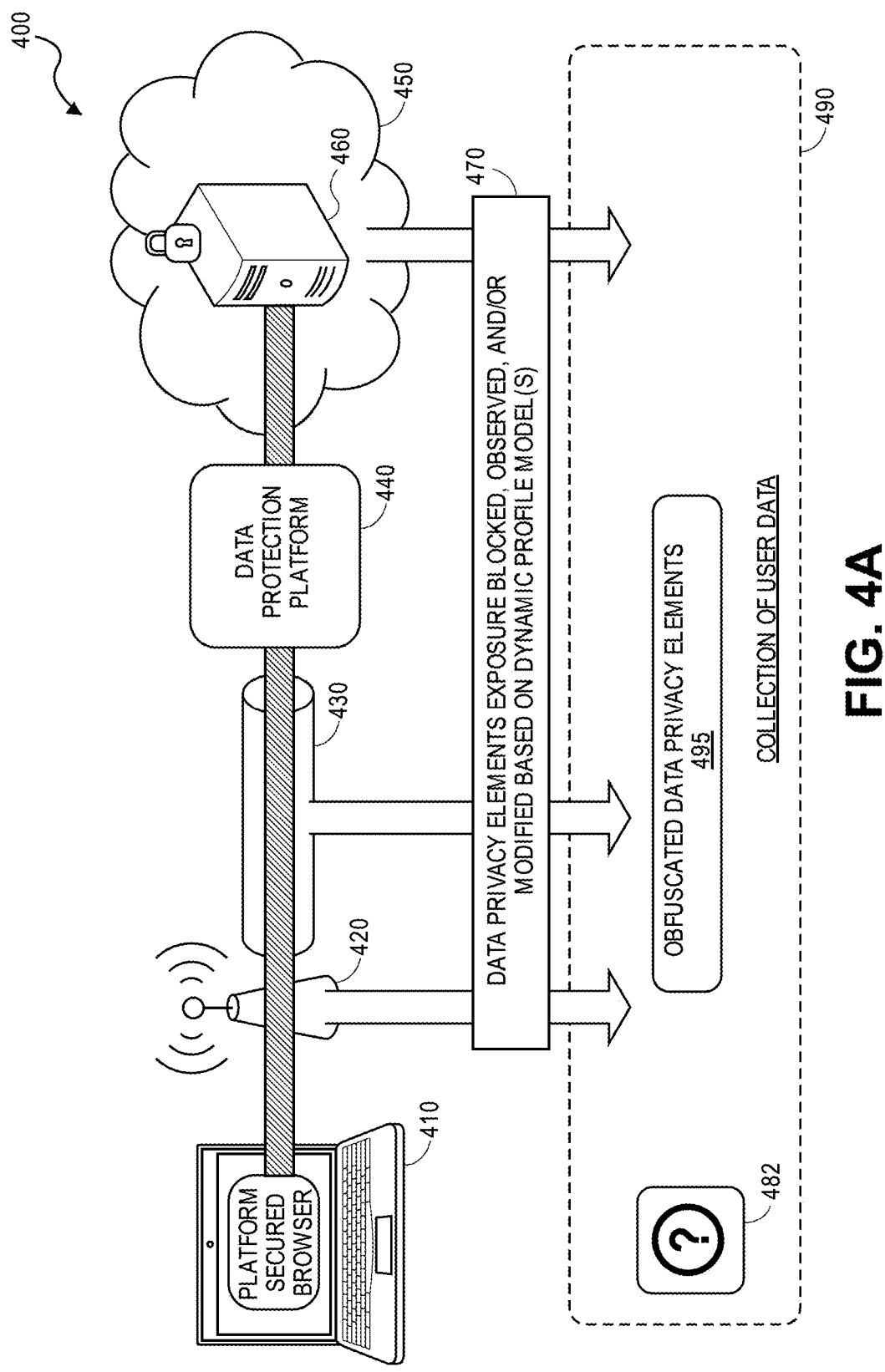

FIG. 4A is a schematic diagram illustrating the network environment of FIG. 3A with the addition of a data protection platform that blocks, modifies, or observes exposable data, according to certain aspects of the present disclosure.

Figure 4B:
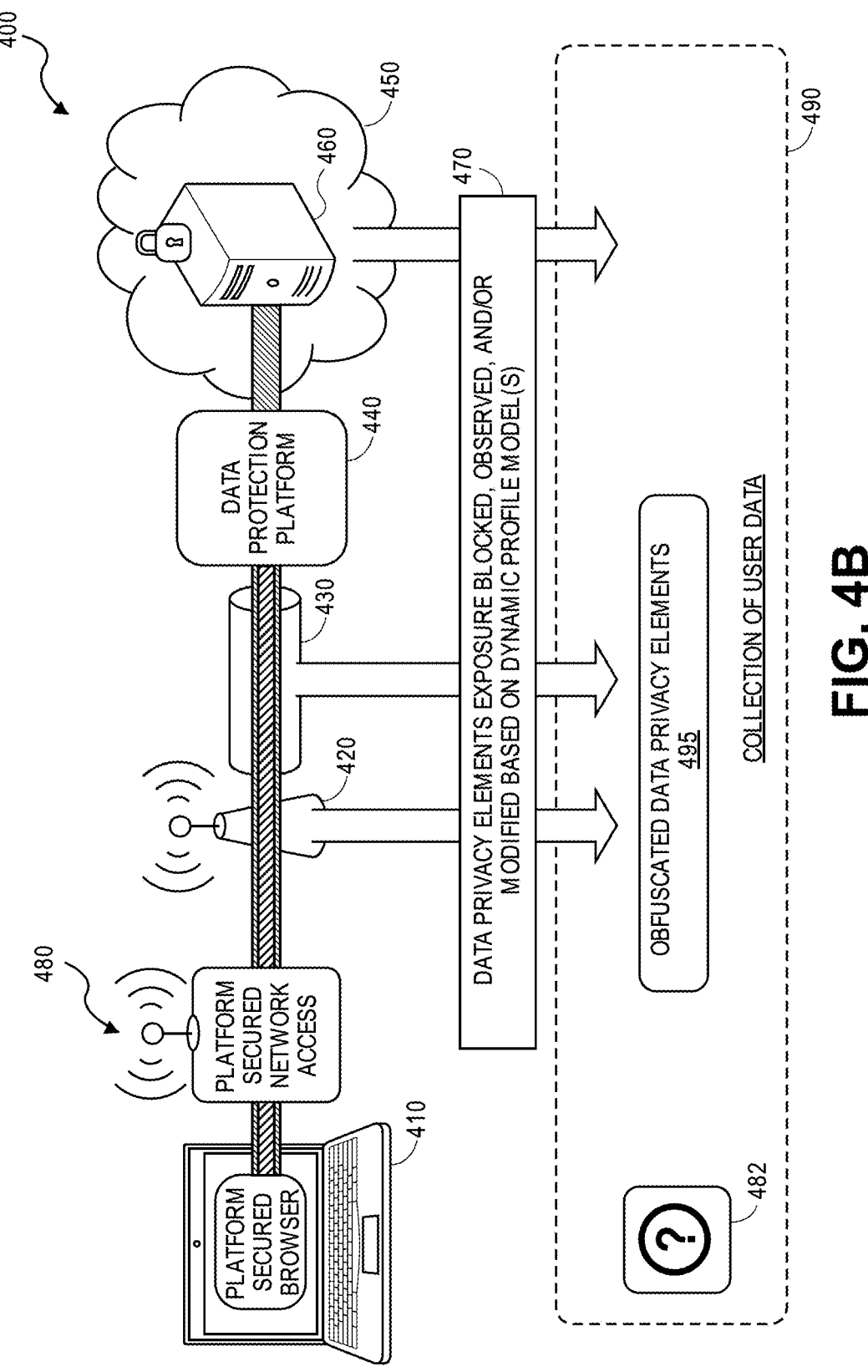

FIG. 4B is a schematic diagram illustrating the network environment of FIG. 3A with the addition of a data protection platform that blocks, modifies, or observes exposable data, and platform-secured network access that isolates the communication, according to certain aspects of the present disclosure.

Figure 4C:
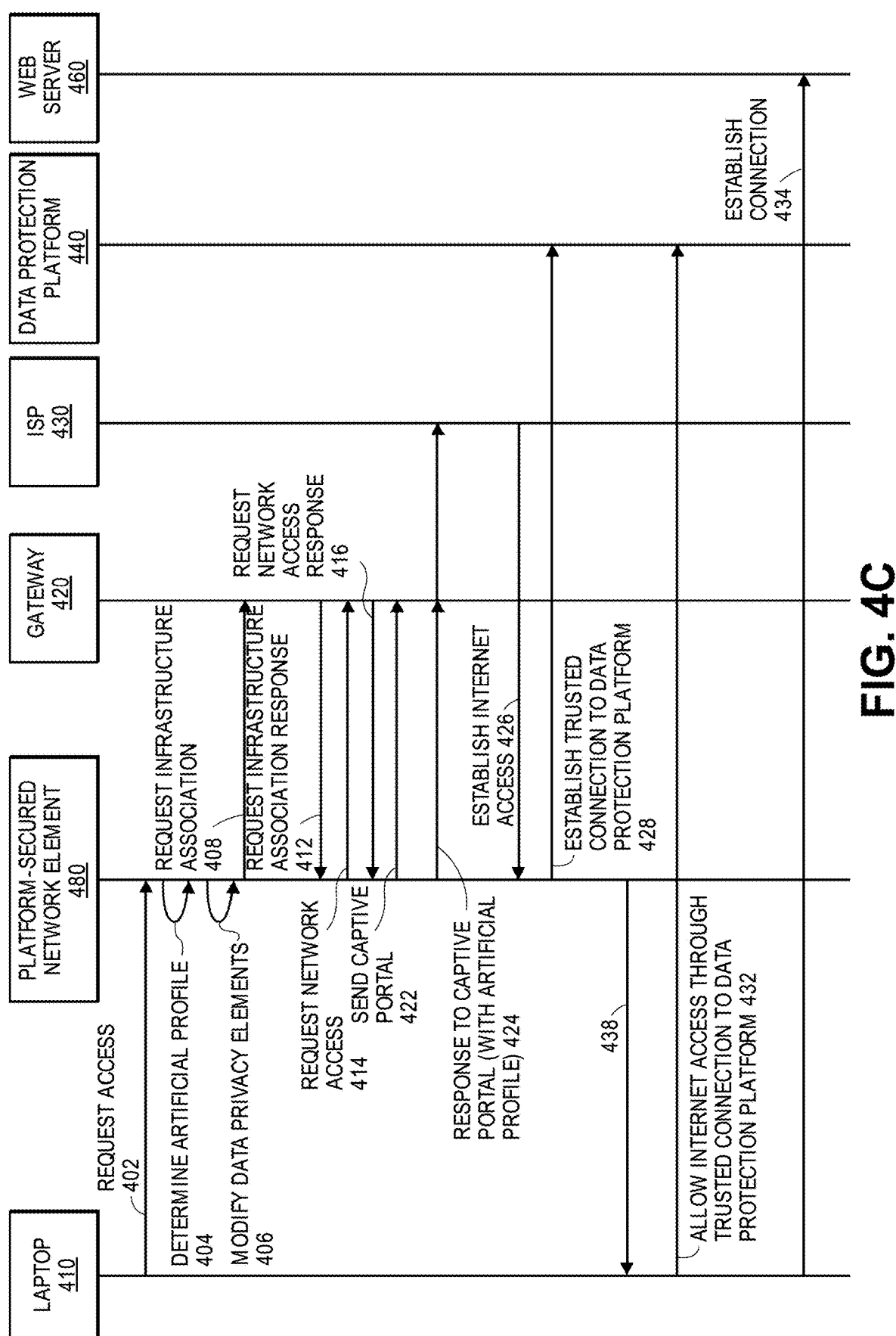

FIG. 4C is a sequence diagram illustrating an example process for enabling a captive portal while protecting data privacy elements, according to certain aspects of the disclosure.

Figure 4D:
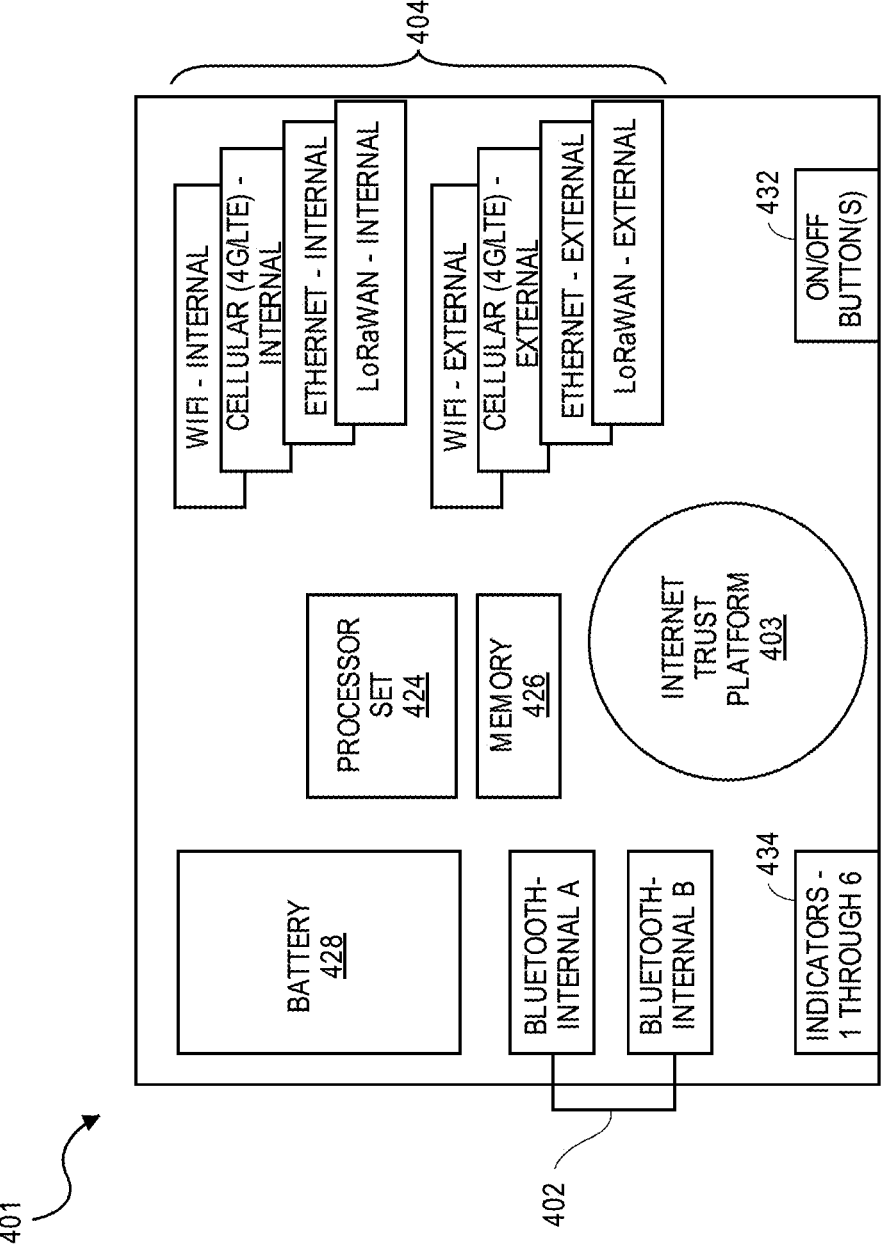

FIG. 4D is a diagram illustrating example components of a device capable of implementing platform-secured network access for isolating a communication.

Figure 5:
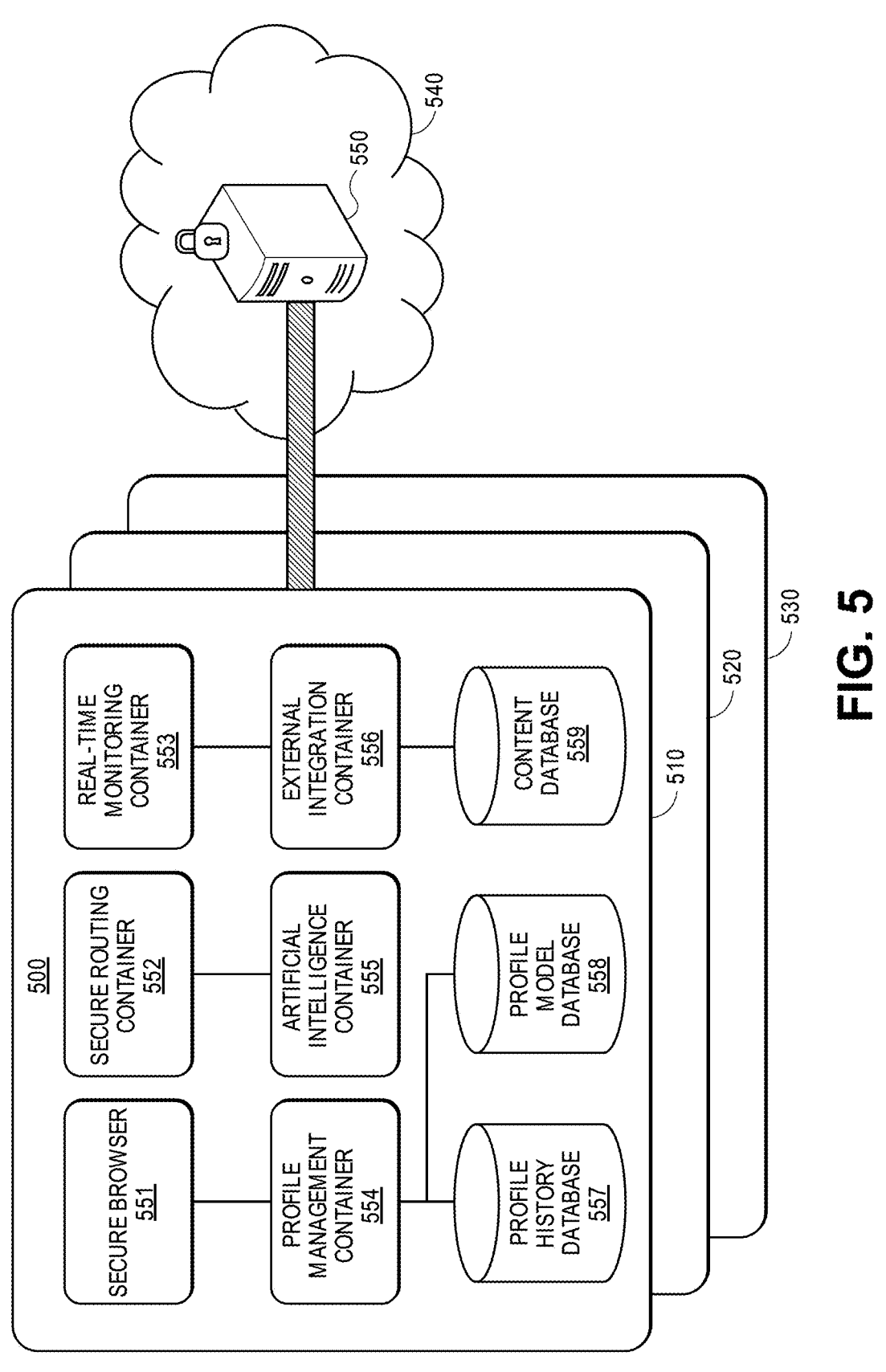

FIG. 5 is a schematic diagram illustrating a data protection platform, according to certain aspects of the present disclosure.

Figure 6:
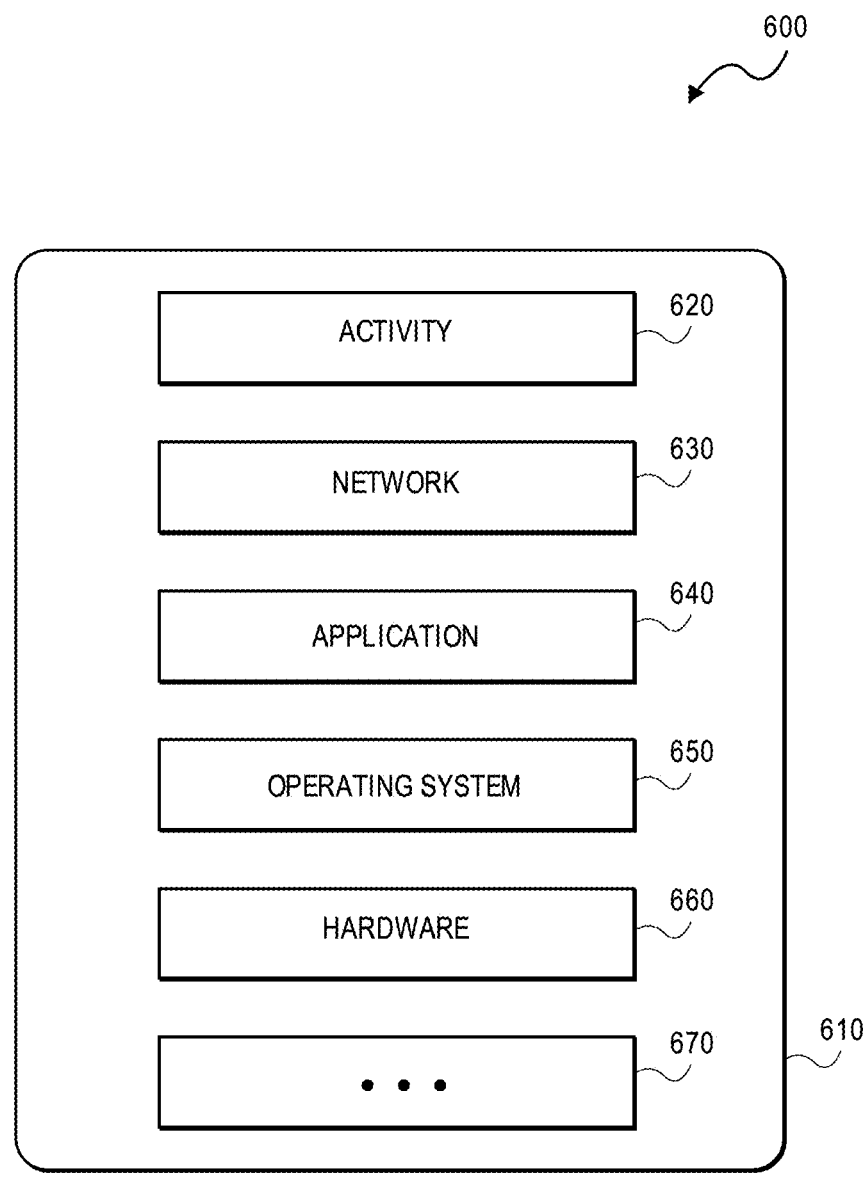

FIG. 6 is a block diagram illustrating a non-exhaustive set of data privacy elements that can be exposed to network hosts.

Figure 7:
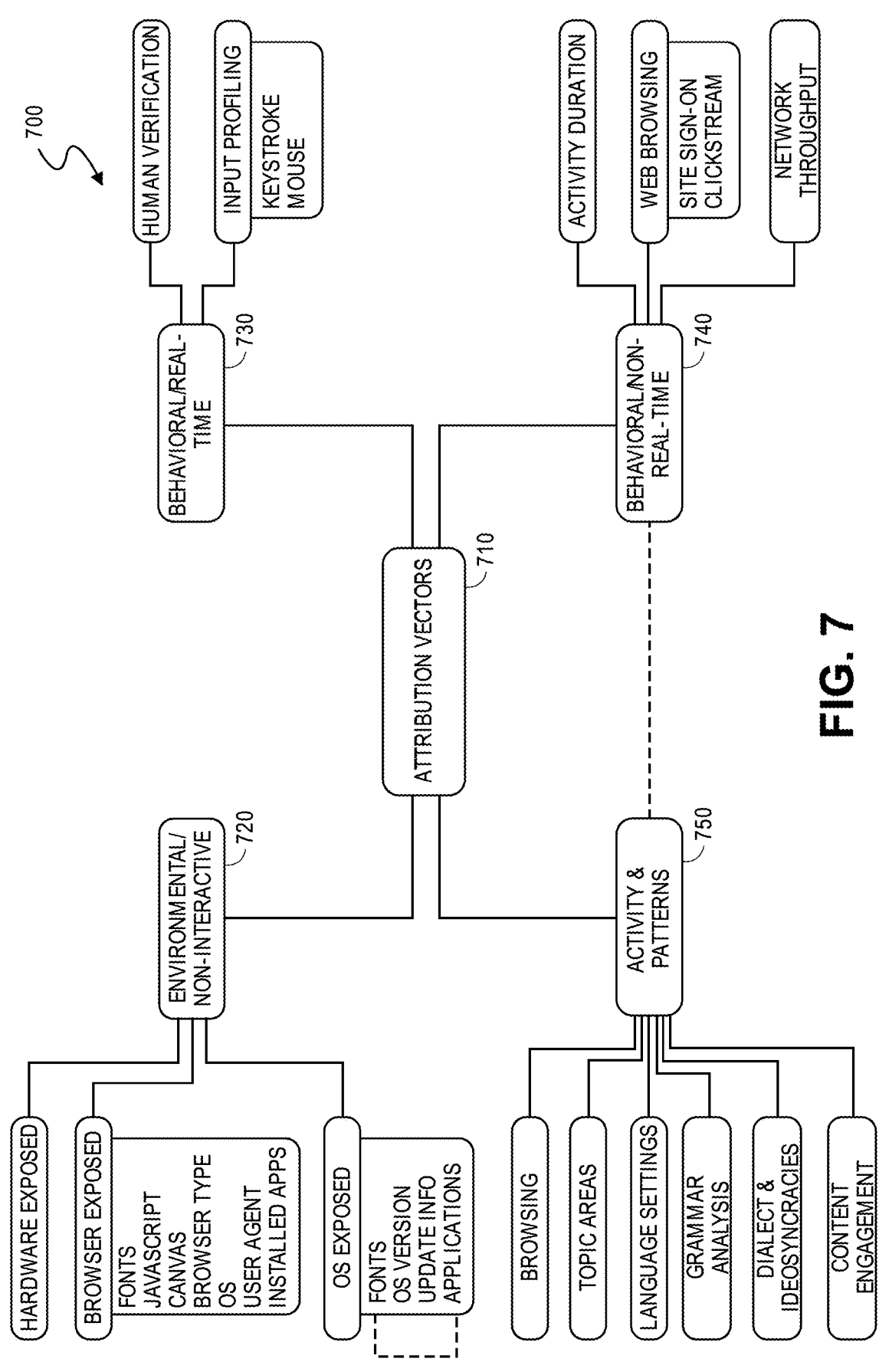

FIG. 7 is a block diagram illustrating an artificial profile model, according to certain aspects of the present disclosure.

Figures 8A, 8B:
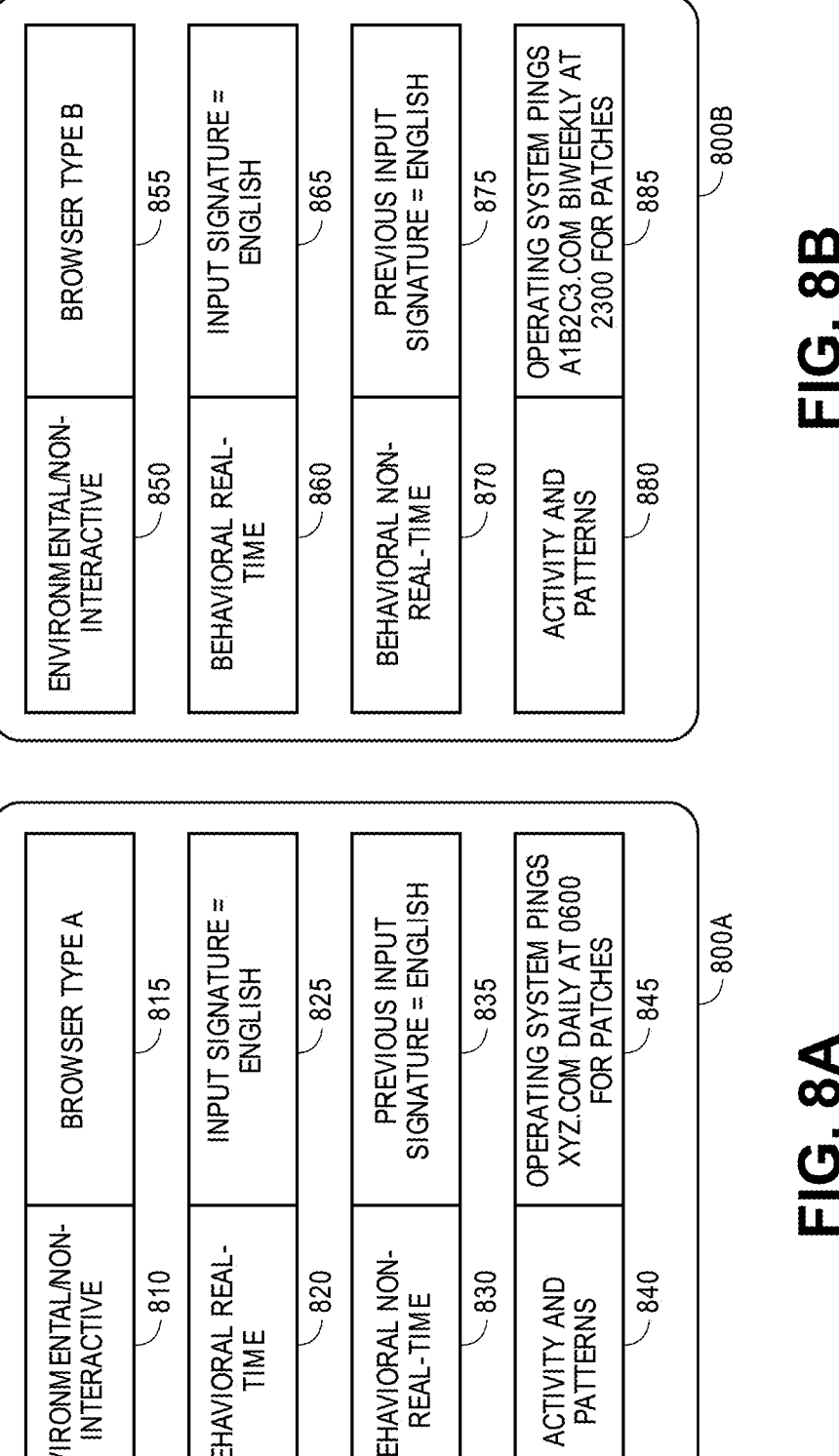

FIGS. 8A-8B are block diagrams illustrating artificial profiles generated using the artificial profile model illustrated in FIG. 7, according to certain aspects of the present disclosure.

Figure 9:
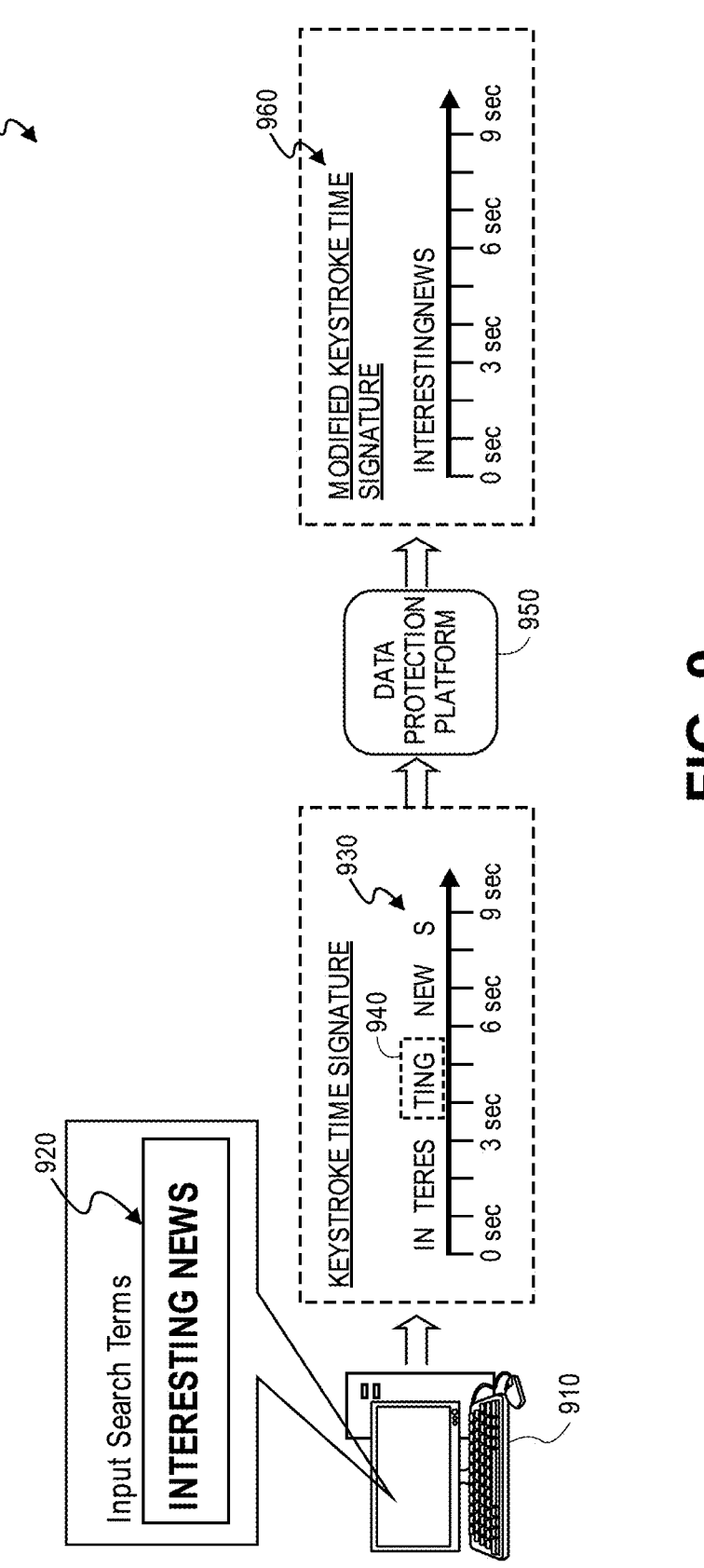

FIG. 9 is a diagram illustrating a process flow for controlling input signatures during an interaction session, according to certain aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to systems and methods for controlling data exposure using artificial-intelligence-based (hereinafter referred to as "AI-based") profile models. Specifically, certain aspects and features of the present disclosure relate to systems and methods for providing a data protection platform that is configured to automatically manage the exposure of data privacy elements. For example, a data privacy element may be any item of data that can be exposed (e.g., accessible) to a third-party, such as a hacker. Data privacy elements can be evaluated (e.g., alone or in combination with other data, such as social media profiles) to expose information about users and/or or network systems (e.g., organizations). Non-limiting examples of data privacy elements include activity data (e.g., web browsing history), network data (e.g., network topology), application data (e.g., applications downloaded on the computing device), operating system data (e.g., the operating system (OS) and the corresponding version of the OS running on the computing device), hardware data (e.g., the specific hardware components that comprise the computing device), and other suitable data that exposes information about a user and/or a network.

When a computing device accesses the Internet, various data privacy elements may be exposed as the computing device navigates across web servers. For example, when the computing device accesses an Internet Service Provider (ISP), certain data privacy elements may be stored at the ISP's servers as the ISP facilitates an Internet connection. However, the data privacy elements that are stored at the ISP's servers may be accessible to other network hosts, such as authorized users (e.g., network security engineers) or unauthorized users (e.g., hackers). The accessibility of the stored data privacy elements by other users exposes the data privacy elements. This data exposure creates a security risk because the data privacy elements can be used by unauthorized users, for example, to identify vulnerabilities of the computing device or of the network systems to which the computing device is connected. Identifying vulnerabilities leaves the computing device or the network to which the computing device is connected open to data breaches or other nefarious conduct.

According to certain embodiments, the data protection platform can enhance data protection by controlling and/or managing the exposure of the data privacy elements. In some implementations, the data protection platform (described in greater detail at FIG. 5) may include an application that is deployed in a cloud network environment. For example, the data protection platform may include an application server on which an application is stored, which, when executed, performs various operations defined by the data protection platform. The data protection platform may also include one or more database servers on which the storage functionalities associated with the application can be performed in the cloud network environment. In some implementations, the computing device (e.g., operating by a user) can connect to the data protection platform using a platform-secured browser. For example, the platform-secured browser can be hosted by the data protection platform to avoid the Internet activity performed on the computing device being stored locally at the computing device. According to certain embodiments, while the computing device navigates the Internet using the platform-secured browser, the data protection platform can automatically, dynamically, in real-time, and/or intelligently control the exposure of data privacy elements associated with the computing device or the network to which the computing device is connected. Non-limiting examples of controlling the exposure of data privacy elements can include blocking data privacy elements from being accessible by web servers or application servers, blocking data privacy elements from being stored at web servers or application servers, modifying one or more data privacy elements according to an artificial profile model, providing the data privacy elements to web servers or applications servers, detecting which data privacy elements are exposed, determining which data privacy elements are required to enable Internet activity (e.g., certain websites do not function if cookies are disabled), determining which data privacy elements are not required to enable Internet activity, modifying a feature (e.g., a time signature of keystrokes, taps, or mouse clicks) of input received from the computing device, or other suitable techniques for controlling exposure of data privacy elements. In some implementations, artificial profiles can be specific to certain organizations, industries, subject matter, or user-defined applications. For example, the artificial profiles specific to an organization would include data privacy elements that are relevant or consistent with data privacy elements that would be expected for the organization.

Advantageously, the data protection platform can control the exposure of data privacy elements to protect the privacy of the user, computing device, and/or network systems (e.g., operated by organizations, companies, governments, or other suitable entities) as the computing device navigates the Internet. For instance, if a network host can collect data privacy elements of users, computing devices, and/or networks (e.g., such that the collection is authorized or unauthorized), the collected data can expose information (e.g., potentially private or sensitive information) about the organization to which the users, computing devices, and/or networks belong. Thus, by using embodiments described herein for managing or controlling the exposure of data privacy elements for users, computing devices, and/or network systems of an organization, the data protection platform thereby manages or controls the exposure of potentially sensitive information about the organization itself. Managing or controlling the exposure of data privacy elements can prevent data breaches of the users, computing devices, and/or network systems because network hosts, such as hackers, can be prevented from collecting certain data privacy elements, or can at least be prevented from collecting accurate data privacy elements, which obfuscate or mask identifies or attributes of the users, computing devices, and/or network systems.

Further, the data protection platform can control the exposure of data privacy elements using artificial profiles, which are generated using an artificial profile model, to obfuscate the user and/or network in a realistic manner. In some implementations, the artificial profile model (described in greater detail with respect to FIG. 7) can include a model that is generated using machine-learning techniques and/or AI techniques. For example, the artificial profile model may include data representing a relationship between two or more data privacy elements. The relationship between the two or more data privacy elements can be automatically learned using machine-learning techniques, for example, or can be user defined based one or more user-defined rules. In some implementations, when the data protection platform modifies a data privacy element to obfuscate a computing device, the modification of the data privacy element can be performed within the constraints of the relationship learned or defined by the artificial profile model.

As a non-limiting example, a specific application may be downloaded on a computing device. Downloading the specific application on the computing device may also cause a specific set of fonts to be installed on the computing device. When the computing device accesses a website, the web server that provides access to the website may execute a tracking asset (e.g., a cookie) that is stored in the computing device's browser. The tracking asset can request certain data privacy elements from the computing device. For example, the tracking asset may request (from the computing device's browser) data privacy elements identifying which fonts are installed on the computing device. From the perspective of the network host (e.g., the web server providing access to the website), if the data privacy elements collected from the computing device indicate that a font is installed on the computing device, or the lack of a font installed on the computing device, that indication may be evaluated to determine (with some likelihood) whether or not an application has been downloaded onto the computing device. Again, from the perspective of the network host, if the exposure of data privacy elements from the computing device indicate with a certain likelihood that an application has been downloaded on the computing device, this information introduces an attack vector (e.g., known or unknown vulnerabilities or exploits associated with that application), exposes user information (e.g., the application is specific to an industry, which exposes the industry associated with the organization), or may not provide any information at all.

According to certain embodiments, the data protection platform can obfuscate the identifiable attributes of the computing device by modifying the data privacy elements (i.e., the identity of the fonts that are installed on the computing device) so that the web server collects inaccurate data about the computing device when the computing device accesses the website. However, the modification of the data privacy elements would not appear to be realistic (e.g., to a hacker) if the identity of the fonts were modified to include a font that was inconsistent with the specific set of fonts associated with the specific application. Accordingly, in order to control the data privacy elements of the computing device in a realistic manner, the artificial profile model can include data representing the relationship between the specific application and the set of specific fonts. Thus, generating an artificial profile for the computing device may involve changing the specific application to a new application, which is exposed to the website, and to also modify the set of specific fonts to a set of new fonts associated with the new application. In this non-limiting example, the modified data privacy elements collected by the website (i.e., the identity of the new application and the set of new fonts) will seem realistic to a hacker because both data privacy elements (e.g., the application and the associated set of fonts) are consistent with each other. As an advantage of the disclosed embodiments, generating artificial profiles to be consistent with dependencies defined in the artificial profile model increases the realistic nature of the modified artificial profiles so as to enhance the data protection of computing devices and/or networks.

These non-limiting and illustrative examples are given to introduce the reader to the general subject matter discussed here and are not intended to limit the scope of the disclosed concepts. For example, it will be appreciated that data privacy elements other than fonts can be collected, including, but not limited to, which plugins are installed in the browser of the computing device, or any other information collectable from a browser, computing device, or Operating System running on the computing device. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram illustrating network environment 100, in which exposable data can be accessed by authorized or unauthorized network hosts, according to certain aspects of the present disclosure. Network environment 100 can include Internet 110, site network 120 and home network 130. Each of Internet 110, site network 120, and home network 130 can include any open network, such as the Internet, personal area network, local area network (LAN), campus area network (CAN), metropolitan area network (MAN), wide area network (WAN), wireless local area network (WLAN); and/or a private network, such as an intranet, extranet, or other backbone. In some instances, Internet 110, site network 120, and/or home network 130 can include a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In some implementations, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

As illustrated in the example of FIG. 1, site network 120 may be connected to computer 160, home network 130 may be connected to mobile device 170 (e.g., a smartphone) and smart TV 180 (e.g., a television with Internet capabilities), and Internet 110 may be connected to secure server 140. Site network 120 may be a network that is operated by or for an organization, such as a business. Computer 160 may connect to secure server 140 using site network 120. Home network 130 may be a network that is operated by or for a residential area, such as a single family dwelling or an apartment complex. Mobile device 170 and smart TV 180 may connect to secure server 140 using home network 130. Secure server 140 may be any server connected to the Internet or a cloud network environment. For example, secure server 140 may be a web server that is hosting a website. It will be appreciated that, while network environment 100 shows a single site network and a single home network, any number of network in any configuration can be included in network environment 100.

In some implementations, network host 150 may a computing device (e.g., a computer) connected to a computer network, such as any of Internet 110, site network 120, and/or home network 130. In some implementations, network host 150 may be any network entity, such as a user, a device, a component of a device, or any other suitable network device. In some instances, network host 150 may be an authorized device, such as a web server that allows users to access a website, an application server that allows users to access an application, a network security engineer, or other suitable authorized devices. In some instances, network host 150 may be an unauthorized network host, such as a hacker, a computer virus, or other malicious code. For example, network host 150 may be able to access secure server 140, site network 120, and/or home network 130 to collect exposable data privacy elements that expose information about secure server 140, site network 120, computer 160, home network 130, mobile device 170, and/or smart TV 180. As computer 160, mobile device 170, and/or smart TV 180 communicate over Internet 110, for example, with secure server 140, various exposable data privacy elements can be collected and stored at servers or databases of any of site network 120, home network 130, or Internet 110. Either substantially in real-time (with Internet activity of computer 160, mobile device 170, or smart TV 180) or non-real-time, network host 150 can access the data privacy elements that may be stored at secure server 140, site network 120, and/or home network 130. Network host 150 can access the stored data privacy elements in an authorized manner (e.g., a website that allowed access after a cookie has been installed in a browser) or an unauthorized manner (e.g., secure server 140 may be hacked by network host 150). Either way, network host 150 can evaluate the collected data privacy elements to determine whether there are any vulnerabilities in any aspects of secure server 140, site network 120, and/or home network 130. Network host 150 can then use the vulnerabilities to execute a data breach. The ability of network host 150 to collect exposable data privacy elements is described in greater detail with respect to FIG. 2. Further, according to certain embodiments described herein, the data protection platform can be used to prevent network host 150 from accessing or collecting the data privacy elements or to obfuscate the real data privacy elements so as to provide inaccurate or useless information to network host 150.

FIG. 2 is a schematic diagram illustrating network environment 200, in which exposable data associated with computing devices can be accessed by authorized or unauthorized network hosts, according to certain aspects of the present disclosure. In some implementations, network environment 200 can include secure server 1230, network 210, gateway 220, mobile device 250, smart TV 260, and laptop 270. For example, network environment 200 may be similar to or a more detailed example of home network 130 of FIG. 1. Mobile device 250, smart TV 260, and laptop 270 may be located within a defined proximity, such as within a home or residence. Secure server 230 may be the same as or similar to secure server 140, and thus, further description is omitted here for the sake of brevity. Network 210 may be the same as site network 120 or home network 130 of FIG. 1, and thus, further description is omitted here for the sake of brevity. Network host 240 may be the same or similar to network host 150, and thus, further description is omitted here for the sake of brevity. Gateway 220 may be an access point (e.g., a router) that enables devices, such as mobile device 250, smart TV 260, and laptop 270 to connect to the Internet. FIG. 2 is provided to illustrate how network host 240 can collect exposable data privacy elements from secure server 230 based on routine and seemingly innocuous data communications between devices.

As a non-limiting example, smart TV 260 may be configured to automatically and periodically transmit a signal to secure server 230. The signal may correspond to a request for updates to the software stored on smart TV 260. In this non-limiting example, secure server 230 may be a server that stores software updates or that controls the distribution of software updates to smart TVs like smart TV 260. However, the signal transmitted from smart TV 260 may include data privacy elements that expose information about smart TV 260, gateway 220, and/or network 210. For example, the signal may include a variety of data privacy elements, including, but not limited to, the version of the software currently stored on smart TV 260, the viewing data collected by smart TV 260 (if authorized by the user), the service set identifier (SSID) of gateway 220, a password to connect to gateway 220, login credentials associated with a user profile recently logged into on smart TV 260, information about the hardware or firmware installed in smart TV 260, information about the hardware, firmware, or software recognized to be installed at gateway 220, the physical location of smart TV 260 (e.g., determined using an Internet Protocol (IP) address), applications downloaded by a user on smart TV 260, and/or application usage data. The data privacy elements included in the signal may be stored at secure server 230.

In some cases, if relatively sensitive information is included in the signal, such as viewing data (e.g., accessed video content) recently collected by smart TV 260, secure server 230 may store that sensitive information securely behind protection mechanisms, such as firewalls. However, secure server 230 may be hacked by network host 240. In this scenario, the sensitive information (i.e., the data privacy elements included in the signal and subsequently stored at secure server 230) may be exposed to network host 240.

In some cases, if relatively innocuous information is included in the signal, such as the version of software stored on smart TV 260 or the SSID of gateway 220, the information may be stored at secure server 230 without many protection mechanisms, such as firewalls. For instance, secure server 230 may not need to securely store the version of the software currently stored on smart TV 260 because this information may be relatively innocuous. However, network host 240 can access secure server 230, either in an authorized or unauthorized manner, to obtain the exposed data privacy element of the software version. The software version can nonetheless be used maliciously by bad actors because the software version can be exploited to identify vulnerabilities in the software. The identified vulnerabilities can be used to execute a data breach or hacking of smart TV 260, which places at risk the privacy information associated with a user of smart TV 260.

FIG. 2 illustrates the problem of data privacy elements being exposable to other hosts, such as servers, hackers, websites, or authorized users, during an interaction between devices, such as smart TV 260 and secure server 230. Exposable data privacy elements can be exploited by unauthorized hosts, such as hackers, to determine vulnerabilities that can be exploited to attack a network or an individual device. Further, exposable data privacy elements can also be exploited by authorized hosts, such as a website, to profile users based on online activity; however, this profiling can create risks of private information being exposed.

FIG. 3A is a schematic diagram illustrating network environment 300, in which exposable data can be accessed by authorized network hosts (e.g., a web server hosting a webpage, an application server hosting an application, and so on) or unauthorized network hosts (e.g., a hacker) at various stages of a browsing session. FIG. 3B is a schematic diagram illustrating the network environment of FIG. 3A with the addition of platform-secured network access 380 that isolates the communication, according to certain aspects of the present disclosure. Further, FIGS. 4A and 4B are schematic diagrams illustrating network environment 400, which is similar to network environment 300, but with the addition of an exemplary data protection platform 440 that controls the exposure of data privacy elements to block or obfuscate private information from being exposed, according to certain embodiments. Additionally, FIG. 4D is a diagram illustrating example components of a device capable of implementing platform-secured network access for isolating a communication.

Referring again to FIG. 3A, network environment 300 can include laptop 310, gateway 320, ISP 330, network 340, and secure server 350. A browser can be running on laptop 310. The browser can enable a user operating laptop 310 to communicate with secure server 350 through network 340. However, as the browser running on laptop 310 interacts with secure server 350, exposable data privacy elements 370 can be collected at various devices connected to the Internet. For example, gateway 320, ISP 330 can store one or more data privacy elements that can expose information about laptop 310 because laptop 310 communicates with gateway 320 and ISP 330 to connect with secure server 350. While the exposable data privacy elements 370 can be collected at gateway 320, ISP 330, or secure server 350 (e.g., by network host 360), gateway 320, ISP 330, and secure server 350 may or may not be the source of the exposable data privacy elements. For example, the browser running on laptop 310 can expose certain information about the Operating System (OS) installed on laptop 310, but that OS information may be collected by a web server when the web server queries the browser, or when network host 360 accesses the OS information in an unauthorized manner (e.g., by hacking the web server to gain access to the stored OS information).

Referring again to FIG. 3B, in some implementations, network environment 300 can also include a platform-secured network element 380. The platform-secured network element 380 can be a device or a software method that can isolate information (e.g., negotiation information) and protect a resulting communication flow from exploitation or discovery. The systems and methods described herein can be used to isolate and protect a communication flow incorporating known communication methods or protocols (e.g., WiFi, Cellular, Bluetooth, Ethernet, etc.), as well as any future protocols performing a same or similar function.

In some implementations, platform-secured network element 380 can isolate or abstract a connection negotiation from an end user's device (e.g. laptop 310), and ensure that a tunnel is established before allowing communications over a communication path. For example, when a captive portal is passed directly to a user's laptop (e.g., laptop 310), the user would be asked to agree to terms of service before network connectivity was enabled. This action can expose a user's laptop to potential exploit by a malicious network operator or malicious code on a captive portal. The captive portal, for example, can generally have direct access to laptop 310 via the laptop's browser, native network management interface, etc. and access point 320 can have direct access to the end user's networking stack.

The platform-secured network element 380 can enable a captive portal without exposing a user's computing device (e.g. laptop) or other information about the user's computing environment (discussed in more detail in FIG. 4C). The captive portal can be rendered on the platform-secured network element 380 and delivered to the laptop 310, which can prevent the captive portal (or other related hardware) from discovering actual user privacy information from laptop 310. In some embodiments, once the captive portal is successfully navigated, a tunnel can be established and then data can be allowed to flow through the platform-secured network element 380 to a remote connection, with the tunnel protecting the activity and privacy information of a user using laptop 310.

Referring again to FIG. 4A, in some implementations, the addition of data protection platform 440 into network environment 300 (as represented by network environment 400), can control the exposure of data privacy elements as laptop 410 navigates the Internet. In FIG. 4A, gateway 420 may be the same as or similar to gateway 320, ISP 430 may be the same as or similar to ISP 330, network 450 may be the same as or similar to network 340, and secure server 460 may be the same as or similar to secure server 350, and thus, a description of these devices is omitted for the sake of brevity. In some implementations, data protection platform 440 can provide a platform-secured browser for laptop 410. As the user navigates the Internet using the platform-secured browser, data protection platform 440 can block, modify, and/or observe the data privacy elements (e.g., at block 470) that are exposed to devices across the Internet.

Continuing with the example described in FIG. 4A, when a web server queries the platform-secured browser, the data protection platform 440 can block the OS information from being provided to the web server. As another example, the data protection platform 440 can modify the OS information (e.g., using an artificial dynamic model profile), and provide the modified OS information to the web server. According to certain embodiments, network host 482 may collect artificial exposable data privacy elements 495 at block 490, however, the collected data privacy elements obfuscate the actual information about the user operating system, the platform-secured browser, or laptop 410 itself. Advantageously, the collected exposable data privacy elements 495 would not expose any real vulnerabilities of laptop 410.

As noted above in FIG. 4A, the browser running on laptop 410 can interact with secure server 460, and exposable data privacy elements 470 can be collected at various devices connected to the Internet. As noted above, gateway 420 and ISP 430 can store one or more data privacy elements that can expose information about laptop 410 because laptop 410 communicates with gateway 420 and ISP 430 to connect with secure server 460. FIG. 4B illustrates the addition of a platform-secured network element 480 that in some implementations, can protect a communication flow from exploitation or discovery (as noted above). For example, as shown in FIG. 4B, platform-secured network element 480 can be added into network environment 400 at a point between laptop 410 and gateway 420. The location of the platform-secured network element 480 between laptop 410 and gateway 420, being at the initial point of network connection to wifi/ethernet/etc., enables the platform-secured network element 480 to identify data privacy elements 470, determine an artificial profile associated with one or more dependencies, and then modify data privacy elements 470 in accordance with the artificial profile before traffic from laptop 410 leaves its local network.

It will be appreciated that platform-secured network element 480 can be added or inserted at other points within network environment 400, as long as the platform-secured network element 480 is added or inserted within network environment 400 such that it protects a communication flow from exploitation or discovery (e.g., protects laptop 410 and exposable data privacy elements 470 from exposure).

FIG. 4C is a diagram illustrating an example process for enabling a captive portal while protecting data privacy elements, according to certain aspects of the disclosure, and can include elements similar to the network environments included in FIGS. 3B, 4A, and 4B. For example, when connecting to the WiFi within a location (e.g., such as a coffee shop or other public space), there is often a requirement to accept the Terms of Service associated with the public space, such as through a captive portal. To prevent the exposure of data privacy elements, the platform-secured network element 480 can respond to the captive portal using an artificial profile.

For example, in some embodiments, laptop 410 can send a request 402 to access a web page. In response, the platform-secured network element 480 can determine an artificial profile (404) and then can modify data privacy elements (e.g., in accordance with the artificial profile (406)). In these embodiments, the platform-secured network element 480 can then request infrastructure association (408) from gateway 420. After the platform-secured network element 480 receives a response (412) to the infrastructure association request from gateway 420, the platform-secured network element 480 can then request (414) network access from gateway 420. The platform-secured network element 480 can, for example, receive the response (416) from gateway 420, as well as the associated captive portal (422).

For security reasons, the captive portal can be problematic. For example, in some embodiments the captive portal can be delivered from infrastructure out of the user's control. In these embodiments, the platform-secured network element 480 can intermediate the captive portal by intercepting and preventing privacy information exchange between gateway 420 and laptop 410. It can do so by, for example, responding to the captive portal with the modified information based on the artificial profiles generated by the artificial profile models. The response can be sent to gateway 420 and/or ISP 430, ensuring that privacy information associated with laptop 410 never reaches gateway 420 and/or ISP 430 without being modified in accordance with the generated artificial profile(s).

Once gateway 420 and/or ISP 430 receives the response to the captive portal from the platform-secured network element 480, in these embodiments internet access can be established (426) between ISP 430 and the platform-secured network element 480. In response, this can establish (428 and 438) a trusted connection to the data protection platform 440 and to laptop 410. Internet access (432) can then be allowed through the trusted connection from laptop 410 to the data protection platform 440, and a connection (434) can be established between laptop 410 and web server 460.

FIG. 4D is a diagram illustrating example components of a device 401 capable of implementing platform-secured network access for isolating a communication. The device 401 can be a standalone device, embedded within a device in laptop 410's network (e.g., any device between laptop 410 and gateway 420), or an application deployed and/or stored within a cloud network environment. This allows device 401 to be portable and flexible across many different locations and to be scalable to any type of network (e.g., from personal networks to enterprise networks, etc.). For example, the device 401 can be used to provide a "secured" connection point (e.g., WiFi hotspot, ethernet) in one or more locations for travel (e.g., any place in the world), scaled for a single location (e.g., home or office), or used as an enterprise solution for network isolation or signature management. In some implementations, the device 401 can include multiple components such as, multiple hardware communication components (e.g., Bluetooth connections 402), a network negotiation isolation platform (e.g., Internet Trust Platform ("ITP") 403), a communication isolation platform, and a communication interface moving target defense platform (e.g., WiFi, Cellular, Ethernet, LoRaWAN network 404). These communication components may advantageously convert between or among communication protocols to affect the signature of the communications (e.g., WiFi monitoring/eavesdropping would have reduced visibility to connections through an access point as the platform may multiplex connections to a hotspot over a single connection such as acting as a bridge/router/hotspot itself), to move traffic from a congested protocol (e.g., conference center with too many 802.11b/g/n wireless connections present resulting in signal congestion and reduced performance or increased latency) to a less congested protocol (e.g., ethernet, LoRaWAN).

In some implementations, device 401 can be embedded within laptop 410, where multiple hardware communication components can physically separate laptop 410's communications from other functions of the laptop 410, thereby shielding laptop 410 from being exposed or tampered with. According to some embodiments, the multiple hardware communication components can be used to internally isolate the device. Specifically, the multiple hardware communication components can be used to physically separate the communication of the device from other functionalities of the device. This separation can prevent compromise of the communication stream and also enable one-way or software-controlled data diode. In these implementations, a Bluetooth protocol, or any other protocol can be used.

To prevent an attack from happening, an ITP on device 401 can isolate the acceptance of the terms of service process (or any content delivered through the captive portal-like mechanism) away from the user computing device. For example, in some implementations, a network negotiation isolation platform can enable the negotiation and data input to establish external network connections while isolating the user computing device from dirty, unsafe, or unknown network threats (e.g., FIG. 4C). In these implementations, the negotiation and isolation can be enabled by device 401 using a same or similar ITP that protects Data Privacy Elements. For example, when connecting to the WiFi within a public space (e.g., a coffee shop), there is often a requirement to accept the Terms of Service associated with the public space, through a captive portal. Even accessing the page to accept these terms of service can expose data privacy elements and facilitate an attack on a user computing device-regardless of whether the terms were accepted or not. To prevent an attack from happening, an ITP on device 401 can isolate the acceptance of the terms of service process (or any content delivered through the captive portal-like mechanism) away from the user computing device.

In some implementations, a communication isolation platform can utilize one or more transmitters (e.g., in a dual transmitter scenario, one transmitter could be used for negotiating with external, unknown, unsafe, or "dirty" network access, and one transmitter could be used to provide an internal, protected, known, or "clean" network connection), across one or more different physical communication interfaces (e.g., Wi-Fi, Ethernet, cellular). In these implementations, the communication isolation platform can facilitate physical isolation or protection of the user computing device from dirty or unknown network threats. In some implementations, a communication interface moving target defense platform can be used to apply cross-interface routing of communications traffic. In these implementations, the cross-interface routing of communication traffic can alter or defeat a potential compromise of device 401. Moreover, in these implementations, the cross-interface routing of communication traffic can track one or more data privacy elements associated with one or more communication interfaces. The one or more tracked data privacy elements can be stored and/or analyzed for future analysis or decision making, such as analyzed for system performance and to support audit and compliance reporting for compliance with customer industry regulations. The device 401 can further include, but is not limited to, other hardware elements, such as a processor set 424, memory 426, and battery 428, as well as on/off buttons 432 and indicators 434.

FIG. 5 is a schematic diagram illustrating data protection platform 500, according to certain aspects of the present disclosure. In some implementations, data protection platform 500 may be implemented using cloud-based network 510. For example, data protection platform 500 may be an application that is deployed in cloud-based network 510. Data protection platform 500 in cloud-based network 510 may include an application server (not shown) that is constructed using virtual CPUs that are assigned to or reserved for use by data protection platform 500. Further, data protection platform 500 may be implemented using one or more containers. Each container can control the exposure of data privacy elements. A container may include stand-alone, executable code that can be executed at runtime with all necessary components, such as binary code, system tools, libraries, settings, and so on. However, because containers are a package with all necessary components to run the executable code, the container can be executed in any network environment in a way that is isolated from its environment. It will be appreciated that any number of cloud-based networks can be used to implement data protection platform 500. For example, assuming data protection platform 500 is implemented using a set of containers, a subset of the set of containers can be deployed on cloud-based network 510, another subset of the set of containers can be deployed on cloud-based network 520, another subset of the set of containers can be deployed on cloud-based network 530, and so on. It will also be appreciated that data protection platform 500 may or may not be implemented using a cloud-based network.

Referring to the non-limiting example illustration of FIG. 5, data protection platform 500 can include a number of containers that are deployed using cloud-based network 510. For instance, data protection platform 500 can include secure browser 551, secure routing container 552, real-time monitoring container 553, profile management container 554, AI container 555, external integration container 556, profile history database 557, profile model database 558, and content database 559. Further, data protection platform 500 may control the exposure of data privacy elements that are exposable during a browsing session between a computing device (e.g., laptop 410 of FIG. 4A) and secure server 550 on network 540.

In some implementations, secure browser 551 may be a container that includes executable code that, when executed, provides a virtual, cloud-based browser to the computer device. For example, the platform-secured browser running on laptop 410 shown in FIG. 4A may be provided by the data protection platform 500 using secure browser 551. In some implementations, secure routing container 552 may be a container that includes executable code that, when executed, provides the computing device with a virtual private network (VPN) to exchange communications between the computing device and the data protection platform 500. Secure routing container 552 can also facilitate the routing of communications from the computing device or from any container within data protection platform 500 to other devices or containers internal or external to data protection platform 500. For example, if data protection platform 500 is implemented across several cloud-based networks, then secure routing container 552 can securely route communications between containers across the several cloud-based networks. Real-time monitoring container 553 can be a container including executable code that, when executed, monitors the exposable data privacy elements associated with a browsing session in real-time. For example, if a computing device connects with a web server to access a search engine website, real-time monitoring container 553 can monitor the user input received at the search engine website as the user types in the input. In some implementations, real-time monitoring container 553 can control the exposure of behavioral/real-time attribution vectors (e.g., attribution vectors 730, which are described in greater detail with respect to FIG. 7). For example, real-time monitoring container 553 may modify the input dynamics of keystroke events, as described in greater detail with respect to FIG. 9.

Profile management container 554 can include executable code that, when executed, controls or manages the artificial profiles that have been created and stored. For example, profile management container 554 can use artificial intelligence (e.g., Type II Limited Memory) provided by AI container 555 to generate a new artificial profile based on the artificial profile model (e.g., artificial profile model 700 described in greater detail with respect to FIG. 7) and/or administrator entered constraints (e.g., region, demographic, protection level requirements) to ensure that newly created or modified artificial profiles are compliant with previously generated profiles stored in the profile history database 557. AI container 555 can include executable code that, when executed, performs the one or more machine-learning algorithms on a data set of all available data privacy elements to generate the artificial profile model. The generated artificial profile model can be stored at profile model database 558. Further, external integration container 556 can include executable code that, when executed, enables third-party systems to integrate into data protection platform 500. For example, if an organization seeks to use data protection platform 500 to control the exposure of data privacy elements for all employees of the organization, external integration container 556 can facilitate the integration of the third-party systems operated by the organizations. Content database 559 may store content data associated with browsing sessions in a content file system. For example, if during a browsing session between a computing device and a web server, the user operating the browser determines that content data should be stored from the web server, that content data can be stored in content database 559 and the content file system can be updated.

It will be appreciated that data protection platform 500 may include any number of containers to control the exposure of data privacy elements during webpage or application navigation. It will also be appreciated that data protection platform 500 is not limited to the use of containers to implement controlling data privacy elements. Any other system or engine may be used in data protection platform 500 to implement controlling data privacy elements, in addition to or in lieu of the use of containers.

FIG. 6 is a block diagram illustrating non-limiting example 600, which includes a non-exhaustive set 610 of data privacy elements that can be exposed to network hosts or any other device within a network. FIG. 6 is provided to describe in greater detail the various data privacy elements associated with a particular browser, computing device, or network. For example, non-exhaustive set 610 includes the various data privacy elements that can be exposed to network hosts during online activity performed by a computing device, such as computing device 310 of FIG. 3A. Further, the data privacy elements included in non-exhaustive set 610 may also be collected while the computing device is not browsing the Internet or interacting with an application. For example, even though the computing device may not currently be accessing the Internet, one or more data privacy elements may nonetheless be stored at a gateway, an ISP server, or a secure server on the Internet. The stored one or more data privacy elements may have been collected during a previous interaction with the computing device. In this example, the stored one or more data privacy elements are still exposed because a network host can access the stored one or more data privacy elements even while the computing device is not currently accessing the Internet.

In some implementations, non-exhaustive set 610 may include data privacy elements 620, which are related to the online activity of a user. Non-limiting examples of the activity of a user may include any interaction between user input devices and a browser (e.g., the user entering text into a website using a keyboard), the browser and a web server (e.g., the browser requesting access to a webpage by transmitting the request to a web server, the search history of a browser, the browsing history of a browser), the browser and an application server (e.g., the browser requesting access to an application by transmitting the request to the application server), the browser and a database server (e.g., the browser requesting access to one or more files stored at a remote database), the browser and the computing device on which the browser is running (e.g., the browser storing data from a cookie on the hard drive of the computing device), the computing device and any device on a network (e.g., the computing device automatically pinging a server to request a software update), and any other suitable data representing an activity or interaction. In some implementations, data privacy elements 620 may also include a detection of no activity or no interactions during a time period, for example, a period of time of no user interaction or user activity.

In some implementations, data privacy elements 620 may include information about input received at a browser, but that was not ultimately transmitted to the web server due to subsequent activity by the user. For example, if a user types in certain text into an input field displayed on a webpage, but then deletes that text without pressing any buttons (e.g., a "send" button), that entered text may nonetheless be an exposable data privacy element that can reveal information about the user, even though that entered text was never transmitted to a web server. It will be appreciated that the present disclosure is not limited to the examples of data privacy elements 620 described herein. Other data privacy elements related to a user's activity or non-activity that are not mentioned here, may still be within the scope of the present disclosure.

In some implementations, non-exhaustive set 610 may include data privacy elements 630, which are related to information about networks and/or network configurations. Non-limiting examples of information about a network may include a network topology (e.g., how many web servers, application servers, or database servers are included in the network, and how are they connected); network security information (e.g., which Certificate Authorities (CAs) are trusted, which security protocols are used for communicating between devices, the existence of any detected honeypots in the network, and so on); the versions of security software used in the network; the physical locations of any computing devices, servers, or databases; the number of devices connected to a network; the identify of other networks connected to a network; the IP addresses of devices within the network; particular device identifiers of devices, such as a media access control (MAC) address; the SSID of any gateways or access points; the number of gateways or access points; and any other suitable data privacy element related to network information. Network hosts can evaluate data privacy elements 630 to identify and exploit vulnerabilities in the network. It will be appreciated that the present disclosure is not limited to the examples of data privacy elements 630 described herein. Other data privacy elements related to a network that are not mentioned here, may still be within the scope of the present disclosure.

In some implementations, non-exhaustive set 610 may include data privacy elements 640, which are related to information about applications stored on the computing device or accessed by the computing device. Non-limiting examples of application information may include an identity of one or more applications installed on the computing device; an identify of one or more applications accessed by the computing device (e.g., which web applications were accessed by the computing device); a software version of one or more applications installed on the computing device; an identity of one or more applications that were recently or not recently uninstalled from the computing device; the usage of one or more applications installed on the computing device (e.g., how many times did the user click or tap on the execution file of the application); whether an application is a native application stored on a mobile device or a web application stored on a web server or application server; an identity of one or more applications that are active in the background (e.g., applications that are open and running on the computing device, but that the user is not currently using); an identify of one or more applications that are currently experiencing user interaction; the history of software updates of an application; and any other suitable data privacy element relating to applications. It will be appreciated that the present disclosure is not limited to the examples of data privacy elements 640 described herein. Other data privacy elements related to an application that are not mentioned here, may still be within the scope of the present disclosure.

In some implementations, non-exhaustive set 610 may include data privacy elements 650, which expose information about the OS installed on the computing device. Non-limiting examples of OS information may include an identity of the OS installed on the computing device; a version of the OS installed on the computing device; a history of the updates of the OS; an identity of a destination server with which the computing device communicated during any of the updates; an identification of patches that were downloaded; an identification of patches that were not downloaded; and identification of updates that were downloaded, but not properly installed; system configurations of the OS; the settings or the hardware-software arrangement; system setting files; activity logged by the OS; an identity of another OS installed on the computing device, if more than one; and any other suitable data privacy element relating to the OS currently installed or previously installed on the computing device. It will be appreciated that the present disclosure is not limited to the examples of data privacy elements 650 described herein. Other data privacy elements related to the OS that are not mentioned here, may still be within the scope of the present disclosure.

In some implementations, non-exhaustive set 610 may include data privacy elements 660, which expose information about the hardware components of the computing device. Non-limiting examples of hardware information may include an identity of the various hardware components installed on the computing device; an identify of any firmware installed on the computing device; an identity of any drivers downloaded on the computing device to operate a hardware component; configuration settings of any hardware component, firmware, or driver installed on the computing device; a log of which external hardware devices have been connected to the computing device and which ports were used (e.g., Universal Serial Bus (USB) port); the usage of a hardware component (e.g., the CPU usage at a given time); an identify of any hardware components that are paired with the computing device over a short-range communication channel, such as Bluetooth (e.g., has the computing device connected to a smart watch, a virtual-reality headset, a Bluetooth headset, and so on); and any other data privacy elements that relate to hardware information. It will be appreciated that the present disclosure is not limited to the examples of data privacy elements 660 described herein. Other data privacy elements related to the hardware components of the computing device or other associated devices (e.g., a virtual-reality headset) that are not mentioned here, may still be within the scope of the present disclosure. It will also be appreciated that non-exhaustive set 610 may also include data privacy elements 670 that are not described above, but that are within the scope of the present disclosure. Further, there may or may not be overlap between data privacy elements 620, 630, 640, 650, 660, and 670.

While FIG. 6 illustrates a non-exhaustive set of data privacy elements that may be exposed by the user, the browser running on the computing device, the computing device itself, or any device that the computing device interacted with, certain embodiments of the present disclosure include generating a model for creating artificial profiles based on the non-exhaustive set 610 of data privacy elements. The model may be generated using one or more machine-learning techniques and/or one or more AI techniques, as described in further detail with respect to FIG. 7.

FIG. 7 is a block diagram illustrating a non-limiting example of an artificial profile model 700, according to certain aspects of the present disclosure. As described above, certain embodiments provide for generating an artificial profile model, which can be used as the basis for creating artificial profiles for users navigating the Internet. The advantage of using an artificial profile model as the basis for creating or modifying artificial profiles is that the artificial profile model ensures that the newly created or modified artificial profiles are consistent with constraints, relationships and/or dependencies between data privacy elements. Maintaining consistency with the constraints, relationships and/or dependencies that are defined in the artificial profile model makes for more realistic artificial profiles. Further, realistic artificial profiles advantageously decrease the likelihood that a network host will flag an artificial profile as fake, while at the same time obfuscates or blocks information about the user, browser, or computing device.

In some implementations, artificial profile model 700 may be trained by executing one or more machine-learning algorithms on a data set including non-exhaustive set 610 of FIG. 6. For example, one or more clustering algorithms may be executed on the data set including non-exhaustive set 610 to identify clusters of data privacy elements that relate to each other or patterns of dependencies within the data set. The data protection platform can execute the clustering algorithms to identify patterns within the data set, which can then be used to generate artificial profile model 700. Non-limiting examples of machine-learning algorithms or techniques can include artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, the data protection platform can retrieve one or more machine-learning algorithms stored in a database (not shown) to generate an artificial neural network in order to identify patterns or correlations within the data set of data privacy elements (i.e., within non-exhaustive set 610). As a further example, the artificial neural network can learn that when data privacy element #1 (in the data set) includes value A and value B, then data privacy element #2 is predicted as relevant data for data privacy element #1. Thus, a constrain, relationship and/or dependency can be defined between data privacy element #1 and data privacy element #2, such that any newly created or modified artificial profiles should be consistent with the relationship between data privacy elements #1 and #2. In yet another example, a support vector machine can be used either to generate output data that is used as a prediction, or to identify learned patterns within the data set. The one or more machine-learning algorithms may relate to unsupervised learning techniques, however, the present disclosure is not limited thereto. Supervised learning techniques may also be implemented. In some implementations, executing the one or more machine-learning algorithms may generate a plurality of nodes and one or more correlations between at least two nodes of the plurality of nodes. For example, the one or more machine-learning algorithms in these implementations can include unsupervised learning techniques, such as clustering techniques, artificial neural networks, association rule learning, and so on.

In some implementations, the data protection platform can map data privacy elements to a machine-learning model (e.g., artificial profile model 700), which includes a plurality of nodes and one or more correlations between at least two nodes. Based on the mapping and the one or more correlations, the data protection platform can intelligently predict or recommend other data privacy elements that are related to, dependent upon, and/or correlated with data privacy elements included in an existing artificial profile (e.g., in the case of modifying an artificial profile). The execution of the one or more machine-learning algorithms can generate a plurality of nodes and one or more correlations between at least two nodes of the plurality of nodes. Each node can represent a value associated with a data privacy element and correspond to a weight determined by the machine-learning algorithms. In the case of creating new artificial profiles, the data privacy elements included in the newly-created profiles can include a set of data privacy elements that are consistent with any relationships or dependencies identified in artificial profile model 700, and thus, realistic artificial profiles can be created. In the case of modifying existing artificial profiles, the data privacy elements included in the existing artificial profile can be modified in a manner that is consistent with the relationship and dependencies that are identified in artificial profile model 700, and thus, existing artificial profiles can be obfuscated, such that the obfuscated profile would appear to be realistic.

To illustrate and only as a non-limiting example, artificial profile model 700 may be the result of executing one or more clustering algorithms on non-exhaustive set 610. The clustering algorithm may have identified that non-exhaustive set 610 included several distinct groupings or clusters of data privacy elements. For example, the clusters may be identified based on one or more similarities between values of the data privacy elements. In some implementations, the clusters of data privacy elements may be referred to as attribution vectors 710. Further, the clusters of data privacy elements may include environment/non-interactive attribution vector

720, behavior/real-time attribution vector 730, behavioral/non-real-time attribution vector 740, and activity and patterns attribution vector 750. It will be appreciated that any number of attribution vectors or clusters may be determined in artificial profile model 700, and that environment/non-interactive attribution vector 720, behavior/real-time attribution vector 730, behavioral/non-real-time attribution vector 740, and activity and patterns attribution vector 750 are merely non-limiting examples of identifiable clusters of data privacy elements. The present disclosure is not limited to the attribution vectors illustrated in FIG. 7.

Continuing with the non-limiting example, environmental/non-interactive attribution vector 720 may correspond to data privacy elements that are clustered together based on environmental or non-interactive attributes of a computing device or browser. Environmental or non-interactive attributes, in this example, may refer to attributes that are not related or dependent upon a user interaction with a webpage, or that are related to environment attributes of a computer. For example, attribution vectors 720 may include data privacy elements relating to hardware components of a computing device; browser attributes, such as fonts used, browser type, or installed web apps; and OS attributes, such as fonts used by the OS, OS version, information about software updates (e.g., update schedule and IP addresses of update distribution servers), and applications installed in the OS. Additionally, the machine-learning algorithms may have identified patterns in the data privacy elements clustered as environment/non-interactive attribution vectors 720. For example, the dashed line between "hardware" and "browser" in FIG. 7 indicates that the hardware information is relevant data for the browser information (e.g., the types of browsers that can be downloaded on the computing device are constrained by the hardware information). As another example, the dashed line between "fonts" and "applications" in FIG. 7 indicates that the data privacy elements relating to the fonts available in the OS are correlated or dependent on the applications installed in the OS.

In some implementations, behavioral/real-time attribution vector 730 may correspond to data privacy elements that are clustered together based on real-time attributes of a user input (e.g., input or keystroke dynamics of user input received at a browser). Behavioral real-time attributes, in this example, may refer to attributes that are related to or dependent upon real-time user interaction with a webpage, such as mouse movements, mouse clicks, or text inputs. For example, attribution vectors 730 may include data privacy elements relating to input profiling based on keystroke events and/or mouse movements. Input profiling will be described in greater detail below with respect to FIG. 9. Data privacy elements relating to real-time input can be exposed to network hosts and exploited to reveal information about the user.

In some implementations, behavior/non-real-time attribution vector 740 may correspond to data privacy elements that are clustered together based on non-real-time attributes of a user input. Behavioral non-real-time attributes, in this example, may refer to attributes that are determined based on aggregated information from previous online activity performed by the user. For example, attribution vectors 740 may include data privacy elements relating to the average duration of activity on webpages, a bounce rate indicating an average time spend on a webpage before navigating away from the webpage, statistics about clickstream data, and other suitable non-real-time attributes of user input. Attribution vectors 730 and 740 differ in that the data privacy elements relating to attribution vector 730 are based on in-the-moment text input or mouse movements, whereas, data privacy elements relating to attribution vector 740 are based on an evaluation of aggregated data associated with user input.

In some implementations, activity and patterns attribution vector 750 may correspond to data privacy elements that are clustered together based on the content of user input. Activity and patterns attributes, in this example, may refer to attributes that are determined based on the content of the input entered into a browser by a user. For example, attribution vectors 750 may include a data privacy element that exposes the browsing history of the user, the dialect or idiosyncrasies used by the user, the user's engagement with content (e.g., tapping or clicking on advertisement content), and/or any other suitable activity- or pattern-based data privacy elements.

It will be appreciated that artificial profile models may be used by data broker companies (e.g., in an advertising context), while still protecting user privacy. As a non-limiting example and for illustrative purposes only, a user of the data protection platform may utilize a profile to interact with another user or party. Through a trust relationship with that other user or party, the user may select which data privacy elements to expose to the other user or party. As non-limiting examples, the selected data privacy elements can be exposed to the other user or party by passing information along via HTTP headers, HTTP verbs (e.g. POST), or other techniques, such as a YAML (YAML Ain't Markup Language) or XML (Extensible Markup Language). In some implementations, the selected data privacy elements can last for the duration of an online session, can be manually or automatically modified during the online session, or can be automatically modified after each session. For example, an online session may begin when a user logs into the data protection platform. When the user logs into the data protection platform, an artificial profile may be generated for the user, and that artificial profile may include data privacy elements that are the same or different (entirely or partially) as the data privacy elements of the last artificial profile generated for the user. Further, since many existing exploit and exploit techniques are detectable by modern firewalls, the data protection platform can generate artificial profiles to overtly pretend to have vulnerabilities that an organization is capable of defending against. Accordingly, network attacks by network hosts, such as hackers, are inhibited because the network hosts may attempt network attacks based on inaccurate information, the network's firewalls are stopping the attack attempts (and the network attacks that may succeed in accessing the network will likely fail because the data protection platform may be a hybrid mix of containers and inaccurate information).

FIGS. 8A-8B are block diagrams illustrating artificial profiles generated using the artificial profile model illustrated in FIG. 7, according to certain aspects of the present disclosure. FIG. 8A illustrates artificial profile 800A, which represents the data privacy elements that are exposed to a web server when a computing device loads a website, for example. For the purpose of illustration and only as a non-limiting example, artificial profile 800A may include four attribution vectors. The four attribution vectors may include environmental/non-interactive attribution vector 810, behavioral real-time attribution vector 820, behavioral non-real-time attribution vector 830, and activity and patterns attribution vector 840. In some implementations, an attribution vector may be a category, grouping, or classification of data privacy elements.

Environmental/non-interactive attribution vector 810 may be detected when the computing device loads the webpage. Environment/non-interactive attribution vector 810 may include data privacy element 815, which indicates a type of browser running on the computing device. For example, browser type A (e.g., the GOOGLE CHROME browser may be a browser type, and the MOZILLA FIREFOX browser may be another browser type) may be a value of data privacy element 815, which may be detected when computing device loads the webpage. Behavioral real-time attribution vector 820 may include data privacy element 825, which indicates a real-time input signature associated with the input received at the computing device by the user. The input signature of input received at the computing device is described in greater detail with respect to FIG. 9. For example, an input signature of "English" (e.g., detected based on the key dynamics of the input indicating that the letters "TING" are typed sequentially without a pause by the user) may be a value of data privacy element 825, which may be detected when computing device interacts with the webpage. Behavioral non-real-time attribution vector 830 may include data privacy element 835, which indicates a non-real-time input signature associated with previous inputs received at the computing device while accessing the website or other websites. For example, an input signature of "English" may be a value of data privacy element 835, which may be detected when computing device interacts with the webpage or any other webpage at a previous time. Behavioral real-time attribution vector 820 detects, analyzes, and profiles input in real-time as the inputs are being entered by the user operating the computing device, whereas, behavioral non-real-time attribute vector 830 represents a behavioral pattern associated with the user operating the computing device, but which occurred in the past. Lastly, activity and patterns attribution vector 840 may include data privacy element 845, which indicates an activity or pattern of the Operating System (OS) installed on the computing device. For example, an activity or pattern of the detected OS may be that the OS transmits a signal to XYZ.com daily at 6:00 a.m. For example, XYZ.com may be a website that stores or distributes patches for the OS. The signal that is transmitted daily from the OS of the computing device may correspond to a request to download new patches, if any.

While artificial profile 800A represents the real data privacy elements that were exposed to the web server hosting the website accessed by the computing device, new artificial profile 800B represents the modified artificial profile. For example, data protection platform can generate new artificial profile 800B by modifying data privacy elements of artificial profile 800A. Further, data protection platform may modify artificial profile 800A based on an artificial profile model. The artificial profile model may be a model that is generated using machine-learning techniques, and that includes one or more dependences or relationships between two or more data privacy elements. Accordingly, when new artificial profile 800B is generated, the data privacy elements of artificial profile 800A that are modified are done so within the constraints of the artificial profile model, so as to obfuscate the user with a realistic artificial profile. Advantageously, obfuscating information about a user in a realistic manner is more likely to cause a potential hacker to accept the obfuscated information as the real information of the user. Conversely, by modifying artificial profiles without being consistent with underlying dependencies and relationships between data privacy elements, a the potential hacker may recognize the inconsistent as a flag indicating that the artificial profile is includes inaccurate or obfuscated information. If a potential hacker recognizes that the collected data privacy elements are obfuscated, the potential hacker may be more likely to continue a data breach using alternative approaches, potentially elevating the severity of an attack on the network.

Continuing with the non-limiting example illustrated in FIG. 8B, the data protection platform can generate new artificial profile 800B (e.g., a modified version of artificial profile 800A) for the user to obfuscate or mask the user's real data privacy elements (e.g., the data privacy elements included in profile 800A). In some implementations, new artificial profile 800B may include the same attribution vectors as artificial profile 800A, however, the present disclosure is not limited thereto. In some implementations, new artificial profile 800B may include more or less attribution vectors than the underlying artificial profile that is being modified. Environmental/non-interactive attribution vector 850, behavioral real-time attribution vector 860, behavioral non-real-time attribution vector 870, and activity and patterns attribution vector 880 may each correspond to its respective attribution vector in artificial profile 800A, however, the value (e.g., the data underlying the data privacy element) may have been changed. For example, the data protection platform may modify data privacy element 815 from "Browser type A" to "Browser type B" (e.g., from a GOOGLE CHROME browser to a FIREFOX browser). In some implementations, data privacy element 815 is modified before a network host, such as a web server providing access to a webpage, can collect any data from the browser of the computing device or from the computing device itself. When the network host collects data privacy elements from the computing device (e.g., a web server collected data privacy elements from the browser operating on the computing device), the network host will collect the obfuscated data privacy element 855, which indicates that Browser type B is being used, instead of data privacy element 815, which indicates the actual browser being used by the user.

The data protection platform may modify data privacy element 825 from "input signature=English" to "input signature=Undetectable." In some implementations, data privacy element 825 is modified before a network host, such as a web server providing access to a webpage, can collect any data from the browser of the computing device or from the computing device itself. When the network host collects data privacy elements from the computing device (e.g., a web server receiving input entered by the user at the computing device), the network host will collect the obfuscated data privacy element 865, which indicates that the input signature is undetectable, instead of data privacy element 825, which indicates the input signature indicates a likelihood that the user is an English speaker. The data protection platform can change the input signature (e.g., input dynamics) of user input received at the computing device using techniques described in greater detail with respect to FIG. 9. However, as a brief summary, the data protection platform can change the time signature associated with the inputted keystroke events so as to obfuscate any detectable key event features, such as the letters "TING" being typed together without a pause (indicating that the user is likely a native English speaker). Similarly, the data protection platform can modify data privacy element 835 from "previous input signature=English" to "previous input signature=undetectable." Just as with the modification of data privacy element 825 to data privacy element 865, the data protection platform can modify data privacy element

835 to data privacy element 875 using the same or similar technique (e.g., the techniques described in FIG. 9).

The data protection platform may modify data privacy element 845 from "Operating System pings XYZ.com daily at 0600 for patches" to "Operating System pings A1B2C3.com biweekly at 2300 for patches" (e.g., one Operating System's automatic update procedure to another Operating System's automatic update procedure). In some implementations, data privacy element 845 is modified before a network host, such as a web server providing access to a webpage, can collect any data from the browser of the computing device or from the computing device itself. When the network host collects data privacy elements from the computing device (e.g., a web server collected data privacy elements from the browser operating on the computing device), the network host will collect the obfuscated data privacy element 885, which indicates that a the OS pings an external server on a regular schedule, instead of data privacy element 845, which indicates the actual automatic update schedule of the OS installed on the computing device. Had the network host collected data privacy element 845 from the browser of the computing device, the network host could have identified and exploited a vulnerability in the OS installed on the computing device, or a vulnerability in the servers of XYZ.com. However, advantageously, since the network host instead collected modified data privacy element 885 (as part of collecting modified artificial profile 800B from the browser or computing device), the network host collected realistic, yet obfuscated, information about the browser and computing device. Thus, the network host cannot effectively mount an attack on the network or the computing device because modified artificial profile 800B does not expose any real vulnerabilities existing in the browser or the computing.

In some implementations, the data protection platform does not need to generate artificial profile 800A, which includes data privacy elements that were actually detected from the browser or computing device. Instead, the data protection platform can automatically and dynamically generate modified artificial profile 800B, while or in conjunction with, the user browsing webpages on the Internet. In these implementations, the data protection platform does not need to detect the actual data privacy elements exposed by the computing device, but rather, the data protection platform can generate an artificial profile for the user, browser, or computing device, so as to obfuscate any potentially exposable data privacy elements.

FIG. 9 is a diagram illustrating process flow 900 for controlling input signatures during an interaction session, according to certain aspects of the present disclosure. Process flow 900 may be performed at least in part at data protection platform 950. Data protection platform 950 may be the same as or similar to data protection platform 510 of FIG. 5, and thus, a description of data protection platform 950 is omitted here. Process flow 900 may be performed to modify input signatures associated with input received at a platform-secured browser, such as the platform-secured browser of FIG. 4A. In some implementations, an input signature may include a feature that characterizes an input received at the platform-secured browser. For example, a feature may be the time signature of keystrokes inputted at the platform-secure browser, however, the present disclosure is not limited thereto. Another example of a feature that characterizes an input may be movement associated with a cursor or mouse clicks.

The feature of an input can be exposed as a data privacy element when a computing device accesses a website. To illustrate process 900 and only as a non-limiting example, computer 910 may be operated by a use. For instance, the user may be navigating a website or application using a platform-secured browser. The website displayed on the browser of computer 910 may include input element 920. Input element 920 may be a text box displayed on a webpage for a search engine. Further, input element 920 may be configured to receive input from the user operating computer 910. Continuing with the non-limiting example, the user may type the phrase "interesting news" into input element 920. The natural keystroke event timing associated with inputting the letters "interesting news" into input element 920 is shown in keystroke time signature 930. For example, the user may naturally input the letters of "interesting news" in the following pattern: "IN," then a pause, "TERES," then a pause, "TING," then a pause, "NEW," then a pause, and finally the letter "S." The pauses of the pattern may occur naturally as the user types the phrase. The user may move or adjust his or her fingers to continue typing. Naturally, certain letters are more likely to be typed together quickly, such as "TING," and for other letters, there may be a need for a brief pause while the user's fingers adjust or find the next letter on a keyboard.

However, keystroke dynamics, such as a keystroke time signature can be a data privacy element that exposes information about the user operating computer 910. For example, an input profiling technique can be used to determine that keystroke time signature 930 indicates that the user is an English speaker. Letter grouping 940 (i.e., the letters "TING") are often used in the English language, but are not often used together in other languages. Accordingly, the keystroke time signature 930 can be evaluated to detect certain letter groupings, such as letter grouping 940 of "TING" typed sequentially without pauses. The detected letter groups can reveal information about the user to a web server, such as the language of the user.

According to certain embodiments, data protection platform 950 can modify keystroke time signature 930 to obfuscate or block any information that could be extracted from keystroke time signature 930. For example, data protection platform 950 can receive the input of "interesting news" from the platform-secured browser, however, data protection platform 950 can detect keystroke time signature 930 from the received input before transmitting the input to the web server hosting the website that includes input element 920. Instead of transmitting the received input in the pattern of keystroke time signature 930, data protection platform 950 can transmit the letters "interesting news" to the web server with the characteristic of modified keystroke time signature 960. Modified keystroke time signature 960 can indicate that all letters of "interesting news" are typed one-after-another without any pauses. Thus, while the network host, for example, the web server hosting the website that includes input element 920, can gain access to the time signature or detect the time signature of the received input of "interesting news," but the detected time signature at the web server would be modified keystroke time signature 960, instead of the real keystroke time signature of 930. Advantageously, keystroke time signature 930, which represents the natural keystroke dynamics of the user operating computer 910, can be obfuscated so as to prevent an accurate input profiling of the received text.

In some implementations, data protection platform 950 can automatically (or potentially not automatically) modify features of the received input. For example, to modify the keystroke time signature of input text received at an input element, data protection platform 950 can provide an intermediary, such as an invisible overlay over the websites accessed by the platform-secured browser. In some implementations, the intermediary may intercept the input text received at the input element (e.g., before the text is transmitted to the web server), modify the time signature of the input text, and then transmit the input text with the modified time signature to the web server. Other techniques for performing the modification may include modifying input streams, providing on-screen input methods, and other suitable techniques. In some implementations, data protection platform 950 may provide additional information to the user, instead of modifying an input stream. For example, data protection platform 950 can notify the user that the input text is defined by a keystroke time signature that may reveal the language of the input text. In some implementations, the time signature of the input text can be modified immediately (e.g., in real-time) upon being received at the input element, whereas, in other implementations, the time signature of the input text can be modified over a period of time or at a later time. In some implementations, data protection platform 950 can impose an effect on inputted text or inputted mouse interactions, such that the effect automatically changes the browser to modify a time signature of the inputted text or mouse interactions. For example, data protection platform 950 can include a shim that serves as a wedge between the OS and the browser (or application, if being used). The shim can influence or modify how the OS reports inputs received at a keyboard or a mouse. The shim may be used to modify how the OS reports the time signature of inputted text, for example. In some implementations, an intermediary may not be used, but rather the native environment of the application or browser may be structured so that inputs received at the browser are outputted with a defined time signature. In these implementations, the input text or mouse interaction is not intercepted at the browser, but rather, the input text or mouse interaction is defined so as to have a particular time signature. The present disclosure is not limited to detecting the keystroke time signature of inputted text. In some implementations, mouse movement can also be detected as a data privacy element, and subsequently modified by data protection platform 950 to remove any extractable characteristics.

It will be appreciated that the input may also include video signals, audio signals, motion signals, and/or haptic signals (e.g., received from a haptic glove). For example, in the context of a virtual-reality headset, the inputs received at a web server may comprise much more data than text or mouse interactions. Using the techniques described above, data protection platform 950 can modify the inputted video signals, audio signals, motion signals, and/or haptic signals, so as to obfuscate information about the user operating the virtual-reality headset.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A computer-implemented method, comprising:

receiving a request to initiate an online session between a computing device and a secure server, wherein the request is received through a secure communications container implemented on a data protection platform, and wherein the data protection platform is implemented using a set of cloud-based networks;

monitoring in real-time one or more exposable data privacy elements associated with the online session, wherein the one or more exposable data privacy elements are monitored through a monitoring container implemented on the data protection platform, and wherein the one or more exposable data privacy elements enable identification of the computing device;

modifying the one or more exposable data privacy elements, wherein the one or more exposable data privacy elements are modified using an artificial profile associated with the computing device, and wherein the one or more exposable data privacy elements are modified through a profile management container implemented on the data protection platform;

facilitating the online session through the secure communications container and a secure routing container, wherein when the online session is facilitated, communications between the computing device and the secure server are routed through the secure routing container, and wherein the communications include the one or more modified exposable data privacy elements; and storing data associated with the secure server in a content database implemented on the data protection platform, wherein the data is received through the communications during the online session.

2. The computer-implemented method of claim 1, wherein the one or more exposable data privacy elements include a set of keystroke events provided through the computing device, and wherein modifying the one or more exposable data privacy elements includes modifying a set of input dynamics associated with the set of keystroke events.

3. The computer-implemented method of claim 1, wherein the artificial profile is generated based on an artificial profile model and a set of constraints, wherein the artificial profile model includes the one or more exposable data privacy elements and a relationship associated with the set of constraints, and wherein the one or more exposable data privacy elements are modified according to a constraint associated with the relationship defined by the artificial profile model.

4. The computer-implemented method of claim 1, wherein the artificial profile is generated using artificial intelligence, and wherein the artificial intelligence is implemented through an artificial intelligence container implemented on the data protection platform.

5. The computer-implemented method of claim 1, wherein the secure communications container, the monitoring container, the secure routing container, and the profile management container are implemented through distinct cloud-based networks from the set of cloud-based networks.

6. The computer-implemented method of claim 1, wherein the artificial profile includes one or more attribution vectors, and wherein an attribution vector represents a detectable characteristic associated with the computing device.

7. The computer-implemented method of claim 1, wherein the one or more modified exposable data privacy elements further obfuscate information corresponding to hardware and software installed on the computing device.

8. A system including a data protection platform implemented using a set of cloud-based networks, comprising:

one or more data processors; and a non-transitory computer-readable storage medium containing instructions which, when executed on the one or more data processors, cause the one or more data processors to perform operations including:

receiving a request to initiate an online session between a computing device and a secure server, wherein the request is received through a secure communications container implemented on the data protection platform;

monitoring in real-time one or more exposable data privacy elements associated with the online session, wherein the one or more exposable data privacy elements are monitored through a monitoring container implemented on the data protection platform, and wherein the one or more exposable data privacy elements enable identification of the computing device;

modifying the one or more exposable data privacy elements, wherein the one or more exposable data privacy elements are modified using an artificial profile associated with the computing device, and wherein the one or more exposable data privacy elements are modified through a profile management container implemented on the data protection platform;

facilitating the online session through the secure communications container and a secure routing container, wherein when the online session is facilitated, communications between the computing device and the secure server are routed through the secure routing container, and wherein the communications include the one or more modified exposable data privacy elements; and storing data associated with the secure server in a content database implemented on the data protection platform, wherein the data is received through the communications during the online session.

9. The system of claim 8, wherein the one or more exposable data privacy elements include a set of keystroke events provided through the computing device, and wherein modifying the one or more exposable data privacy elements includes modifying a set of input dynamics associated with the set of keystroke events.

10. The system of claim 8, wherein the artificial profile is generated based on an artificial profile model and a set of constraints, wherein the artificial profile model includes the one or more exposable data privacy elements and a relationship associated with the set of constraints, and wherein the one or more exposable data privacy elements are modified according to a constraint associated with the relationship defined by the artificial profile model.

11. The system of claim 8, wherein the artificial profile is generated using artificial intelligence, and wherein the artificial intelligence is implemented through an artificial intelligence container implemented on the data protection platform.

12. The system of claim 8, wherein the secure communications container, the monitoring container, the secure routing container, and the profile management container are implemented through distinct cloud-based networks from the set of cloud-based networks.

13. The system of claim 8, wherein the artificial profile includes one or more attribution vectors, and wherein an attribution vector represents a detectable characteristic associated with the computing device.

14. The system of claim 8, wherein the one or more modified exposable data privacy elements further obfuscate information corresponding to hardware and software installed on the computing device.

15. A computer-program product tangibly embodied in a non-transitory machine-readable storage medium, including instructions configured to cause a data protection platform implemented using a set of cloud-based networks to perform operations including:

receiving a request to initiate an online session between a computing device and a secure server, wherein the request is received through a secure communications container implemented on the data protection platform;

monitoring in real-time one or more exposable data privacy elements associated with the online session, wherein the one or more exposable data privacy elements are monitored through a monitoring container implemented on the data protection platform, and wherein the one or more exposable data privacy elements enable identification of the computing device;

modifying the one or more exposable data privacy elements, wherein the one or more exposable data privacy elements are modified using an artificial profile associated with the computing device, and wherein the one or more exposable data privacy elements are modified through a profile management container implemented on the data protection platform;

facilitating the online session through the secure communications container and a secure routing container, wherein when the online session is facilitated, communications between the computing device and the secure server are routed through the secure routing container, and wherein the communications include the one or more modified exposable data privacy elements; and storing data associated with the secure server in a content database implemented on the data protection platform, wherein the data is received through the communications during the online session.

16. The computer-program product of claim 15, wherein the one or more exposable data privacy elements include a set of keystroke events provided through the computing device, and wherein modifying the one or more exposable data privacy elements includes modifying a set of input dynamics associated with the set of keystroke events.

17. The computer-program product of claim 15, wherein the artificial profile is generated based on an artificial profile model and a set of constraints, wherein the artificial profile model includes the one or more exposable data privacy elements and a relationship associated with the set of constraints, and wherein the one or more exposable data privacy elements are modified according to a constraint associated with the relationship defined by the artificial profile model.

18. The computer-program product of claim 15, wherein the artificial profile is generated using artificial intelligence, and wherein the artificial intelligence is implemented through an artificial intelligence container implemented on the data protection platform.

19. The computer-program product of claim 15, wherein the secure communications container, the monitoring container, the secure routing container, and the profile management container are implemented through distinct cloud-based networks from the set of cloud-based networks.

20. The computer-program product of claim 15, wherein the artificial profile includes one or more attribution vectors, and wherein an attribution vector represents a detectable characteristic associated with the computing device.

21. The computer-program product of claim 15, wherein the one or more modified exposable data privacy elements further obfuscate information corresponding to hardware and software installed on the computing device.

*    *    *    *    *